(12) United States Patent
Hotta et al.

(10) Patent No.: US 7,232,149 B2
(45) Date of Patent: Jun. 19, 2007

(54) KNEE PROTECTION AIRBAG APPARATUS

(75) Inventors: Naoki Hotta, Aichi (JP); Masakazu Hashimoto, Aichi (JP); Atsushi Nagata, Aichi (JP); Yoshio Mizuno, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 329 days.

(21) Appl. No.: 10/942,121

(22) Filed: Sep. 16, 2004

(65) Prior Publication Data

US 2005/0062265 A1 Mar. 24, 2005

(30) Foreign Application Priority Data

Sep. 24, 2003 (JP) ............................. 2003-332014
Sep. 25, 2003 (JP) ............................. 2003-333367

(51) Int. Cl.
*B60R 21/16* (2006.01)

(52) U.S. Cl. .................................. 280/730.1; 280/752

(58) Field of Classification Search ............ 280/730.1, 280/752; 296/70, 35.2
See application file for complete search history.

(56) References Cited

U.S. PATENT DOCUMENTS 3,702,706 A 11/1972 Sobkow 6,155,595 A 12/2000 Schultz
6,217,059 B1 4/2001 Brown et al.

FOREIGN PATENT DOCUMENTS

| DE | 199 46 477 A 1 | 9/1999 |
|---|---|---|
| EP | 1 310 408 A2 | 11/2002 |
| JP | A-2003-205816 | 7/2003 |

*Primary Examiner*—Faye M. Fleming
(74) *Attorney, Agent, or Firm*—Posz Law Group, PLC

(57) ABSTRACT

A knee protection airbag apparatus of this invention has an airbag having a construction in which folded and accommodated below the area in front of the knees of a passenger who is seated, and inflates upward toward the rear of the vehicle so as to be capable of protecting the knees of the passenger, when an inflating gas is inserted. The airbag includes a knee protection inflation portion which is disposed on the upper side of the airbag after completion of inflation and which is capable of protecting both knees of the passenger, and a shin facing portion disposed below the knee protection inflation portion after completion of inflation, in an area extending substantially vertically so as to be at the position of both shins of the passenger. Gas flow paths are disposed within both right and left edge sides of the airbag and can cause the inflating gas flowing at the lower part of the airbag to flow towards the knee protection inflation portion while inhibiting the shin facing portion from greatly inflating in the initial stage of inflation of the airbag.

15 Claims, 29 Drawing Sheets

KNEE PROTECTION AIRBAG APPARATUS

The present application claims priority from Japanese Patent Applications No. 2003-332014 filed on Sep. 24, 2003 and No. 2003-333367 filed on Sep. 25, 2003, the entireties of which are hereby incorporated into the present application by this reference.

BACKGROUND OF THE INVENTION

1. Field of the Invention

This invention relates to a knee protection airbag apparatus having an airbag which is accommodated by being folded at a lower portion in front of the knees of a passenger seated on a seat, and expands and inflates upward in a rear direction of a vehicle in such a fashion as to be capable of protecting the knees of the passenger when an inflating gas is let in the airbag.

2. Description of the Related Art

A knee protection airbag apparatus having a construction described in JP-A-2003-205816 is known. The knee protection airbag apparatus of the prior art is arranged below a steering column in front of a driver's seat and tethers are arranged in a transverse direction inside the airbag after inflation is complete. The tethers are arranged so as to increase the thickness of the portion which impedes motion of the knees of the passenger and to decrease the thickness of the portion by the steering column.

When motion of the knees of the passenger is impeded by the airbag inflated by the knee protection airbag apparatus having the construction described above, motion of the shins of the passenger also often is impeded by the airbag in addition to the knees of the passenger. When the airbag expands and inflates while the passenger is close to a body side portion of the vehicle, the airbag inflating with the inflating gas is likely to push unnecessarily the shins of the passenger because the gap between the shins and the body side portion is small.

SUMMARY OF THE INVENTION

It is an object of the invention to provide a knee protection airbag apparatus capable of stably protecting the knees of the passenger by suppressing unnecessary pushing of the shins.

The object of the invention can be accomplished by a knee protection airbag apparatus having the following construction.

The airbag apparatus includes an airbag having the following construction. Namely, the airbag is folded and accommodated below and to the front of the knees of a passenger seated on a seat, expanding upward when inflated toward the vehicle rear side in such a fashion as to be capable of protecting the knees of the passenger when inflating gas is put in the airbag. The airbag includes a knee protection portion and a shin facing portion. The knee protection portion is arranged upward at the time of completion of inflation and capable of protecting both knees of the passenger. The shin facing portion is arranged below the knee protection inflation portion at the time of completion of inflation. The shin facing portion is arranged in an area extending substantially vertically in such a fashion as to correspond to the feet of both shins of the passenger. On both right and left edge sides of the airbag, gas flow paths are disposed which capable of causing the inflating gas flowing to a lower part of the airbag to flow towards the knee protection inflation portion while inhibiting the shin facing portion from thickly inflating in the initial stage of inflation of the airbag.

In the knee protection airbag apparatus according to the invention, the shin facing portion disposed in the area extending substantially vertically in such a fashion as to correspond to the shins of both feet of the passenger is inhibited from greatly inflating in the initial stage of inflation of the airbag. Therefore, even when the airbag expands and inflates under the state where the passenger is very close to the body side portion of the vehicle, the shins of the passenger are inhibited from being unnecessarily pushed by the airbag. The gas flow paths capable of causing the inflating gas flowing to the lower part of the airbag to flow towards the knee protection inflation portion are arranged in the airbag. Therefore, the knee protection inflation portion is allowed to quickly expand and inflate, and the knee protection inflation portion after completion of its inflation can stably protect the knees of the passenger even when the passenger is very close to the body side portion of the vehicle.

Therefore, the knee protection airbag apparatus of the invention can prevent the shins from being unnecessarily pushed and can stably protect the knees of the passenger.

In the knee protection airbag apparatus having the construction described above, the thickness of the shin facing portion at the time of completion of its inflation is preferably set to smaller than the thickness of the knee protection inflation portion at the time of completion of its inflation.

In the knee protection airbag apparatus having the construction described above, the thickness of the shin facing portion at the time of completion of its inflation is set to smaller than the thickness of the knee protection inflation portion after completion of its inflation. Therefore, even when the shin facing portion impedes the motion of the shins of the passenger at the time of completion of the airbag inflation, the shin facing portion does not excessively push the knees of the passenger.

In the knee protection airbag apparatus having the construction described above, the shin facing portion preferably has a construction that does not permit the inflow of the inflating gas.

When the airbag apparatus has the construction described above, the shin facing portion does not permit the inflow of the inflating gas. Therefore, the excessive pressure on the shins of the passenger can be further restricted at the time of expansion and inflation of the airbag. In the knee protection airbag apparatus having the construction described above, a non-expansible portion that does not permit the inflow of the inflating gas is arranged inside the inflation area of the airbag. Therefore, the capacity of the airbag can be decreased and the airbag can quickly expand and inflate.

In the knee protection airbag apparatus having the construction described above, it is preferred to arrange next to the knee protection inflation portion an auxiliary inflation portion that in the initial stage of inflation of the airbag opens out while in a state not allowing entry of the inflating gas, and subsequently expands by causing the inflating gas from the knee protection inflation portion to flow in when the internal pressure of the airbag elevates.

When the knee protection airbag apparatus has the construction described above, the inflating gas inside the knee protection inflation portion can escape into the auxiliary inflation portion when the internal pressure of the airbag elevates as the motion of the knees of the passenger is impeded by the knee protection inflation portion of the airbag that finishes inflation. Therefore, the inflated knee protection inflation portion can be prevented from unnecessarily pushing the knees of the passenger and the knee protection inflation portion can more stably protect the knees of the passenger.

In the knee protection airbag apparatus having the construction described above, the gas flow paths preferably are formed by an inner tube having flexibility and arranged inside the airbag.

When the knee protection airbag apparatus has the construction described above, the inflating gas flowing into the lower part of the airbag does not directly strike a base fabric constituting the airbag before the inflating gas reaches the knee protection portion and the base fabric constituting the airbag can be protected. In the knee protection airbag apparatus having the construction described above, the inflating gas first flows into the inner tube in the initial stage of inflation of the airbag in such a fashion as to inflate the inner tube. The airbag then unfolds with the progress of inflation of the inner tube and extends. In other words, the airbag extends with inflation of the inner tube under the state where almost no inflating gas has flowed to the periphery of the inner tube yet, and thereby the airbag can extend quickly.

In the knee protection airbag apparatus having the construction described above, when the inner tube has a construction in which it is so arranged as to surround the periphery of the inflator for supplying the inflating gas to the airbag, the inner tube can play a similar role to that of a reinforcing fabric that is generally disposed close to the inflator in the airbag. Therefore, a reinforcing fabric need not be provided separately to the airbag.

In the knee protection airbag apparatus having the construction described above, it is preferred to employ a construction in which the shin facing portions are separately arranged on the right and left in such a fashion as to correspond to the right and left shins and a center gas flow path capable of causing the inflating gas flowing to the lower part of the airbag to flow out towards the knee protection inflating portion is disposed between the knee facing portions.

When the knee protection airbag apparatus has the construction described above, the inflating gas flowing into the airbag flows into the knee protection inflation portion through the center gas flow path disposed between the shin facing portions. Therefore, in comparison with an airbag not having separately the shin facings portions on the right and left, the airbag apparatus of the invention can cause the inflating gas to more quickly flow into the knee protection inflation portion. Consequently, the airbag can expand more quickly.

When the airbag having the center gas flow path is used, the knee protection airbag apparatus is preferably disposed in front of the passenger seated on the driver's seat and below the steering column.

DESCRIPTION OF THE PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Embodiments of the invention will be hereinafter explained with reference to the accompanying drawings.

Figure 1:
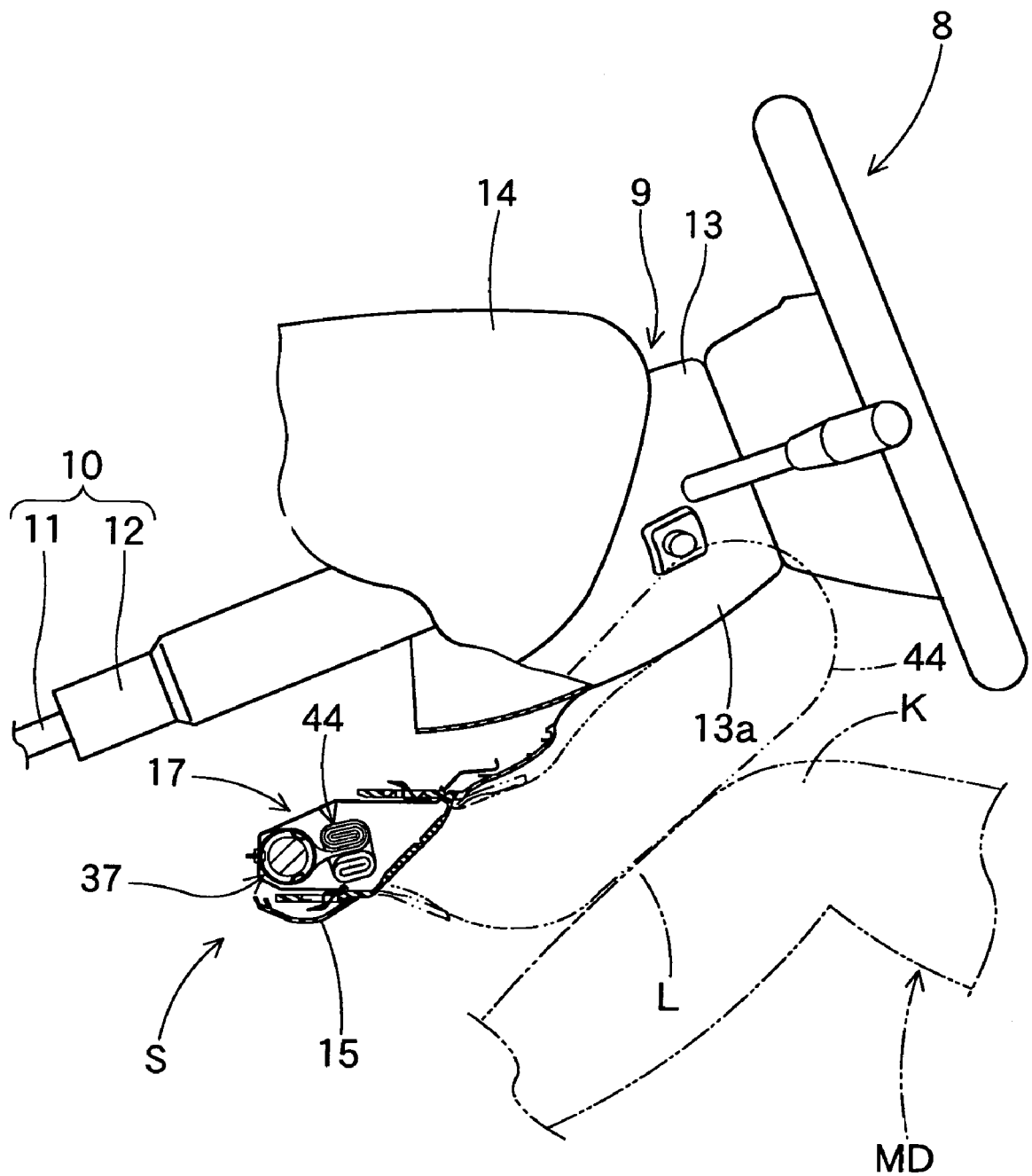
FIG. 1 is a schematic longitudinal sectional view in a longitudinal direction of a vehicle and shows a use condition of a knee protection airbag apparatus according to an embodiment of the invention.
Figure 4:
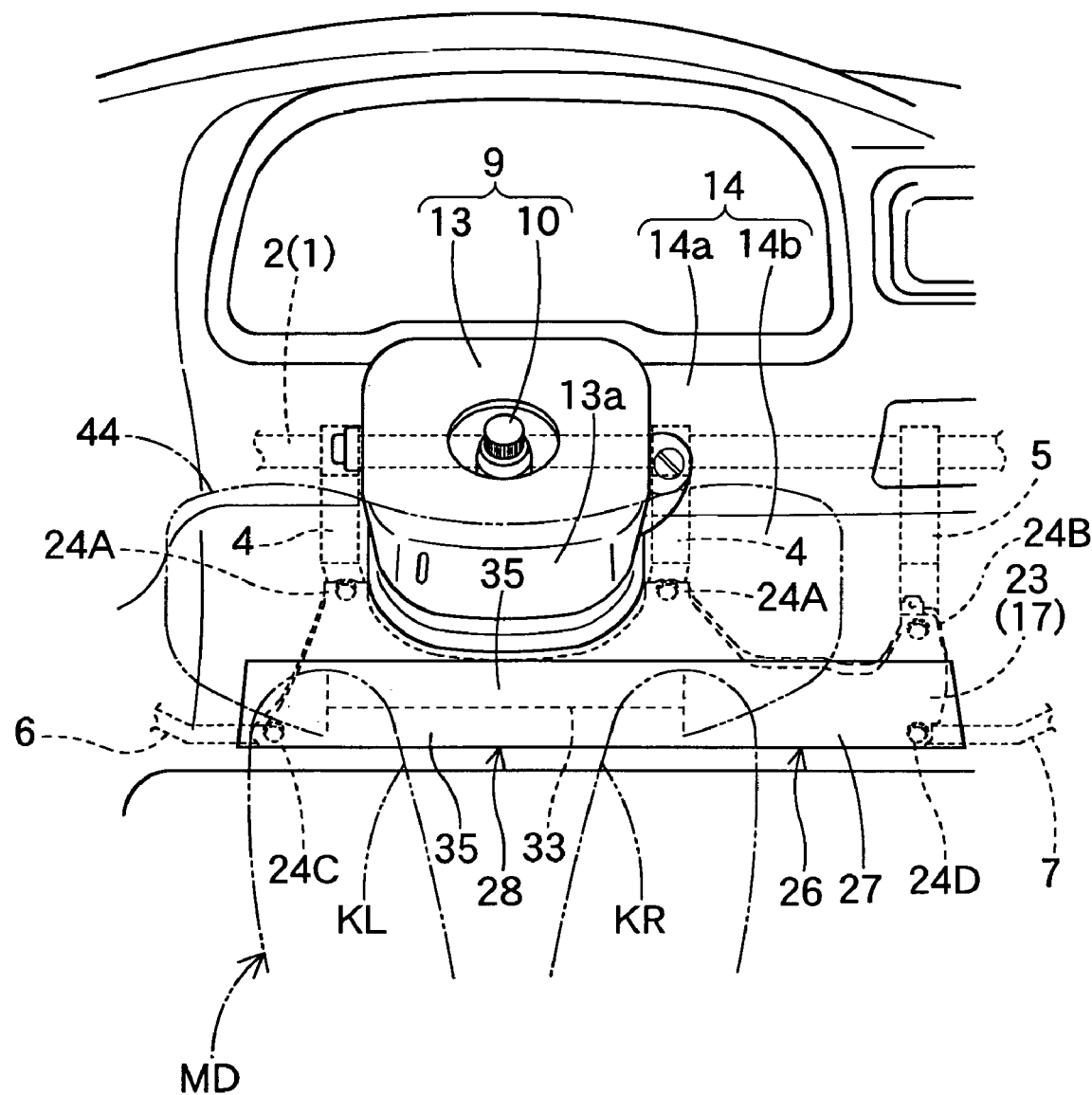
FIG. 4 is a schematic front view showing the use condition of the knee protection airbag apparatus when it is viewed from the back of the vehicle.

A knee protection airbag apparatus S capable of accomplishing the object of the invention is arranged below a steering column 9 on a vehicle front side of a driver MD in such a fashion as to be capable of protecting the knees (KL, KR) of the driver as a passenger as shown in FIGS. 1 and 4.

Incidentally, the terms "up and down", "right and left" and "front and back" used in this specification mean "up and down", "right and left" and "front and back" when the knee protection airbag apparatus S is mounted to the vehicle.

The steering column 9 includes a column main body 10 and a column cover 13 as shown in FIG. 1. The column main body 10 is interconnected to a steering wheel 8. The column cover 13 covers the column main body 10 below the steering wheel 8. The column main body 10 includes a main shaft 11 and a column tube 12 that surrounds a periphery of a main shaft 11.

The column cover 13 is arranged at the axis of the column main body 10 in such a fashion as to cover the column main body 10. The column cover 13 is formed of a synthetic resin in substantially the shape of a rectangular cylinder. The rear surface 13a of the portion of the column cover 13 protruding from instrument panel 14 is formed from a substantially rectangular sheet into a curved surface rising from front to rear in the longitudinal direction of the vehicle.

The knee protection airbag apparatus S includes a folded airbag 44, an inflator 37 for supplying an inflating gas to the airbag 44, a case 17 whose vehicle rear end side is open and an airbag cover 26 that covers the vehicle rear end side of the opening in the case 17. The case 17 accommodates the folded airbag 44 and the inflator 37.

Figure 2:
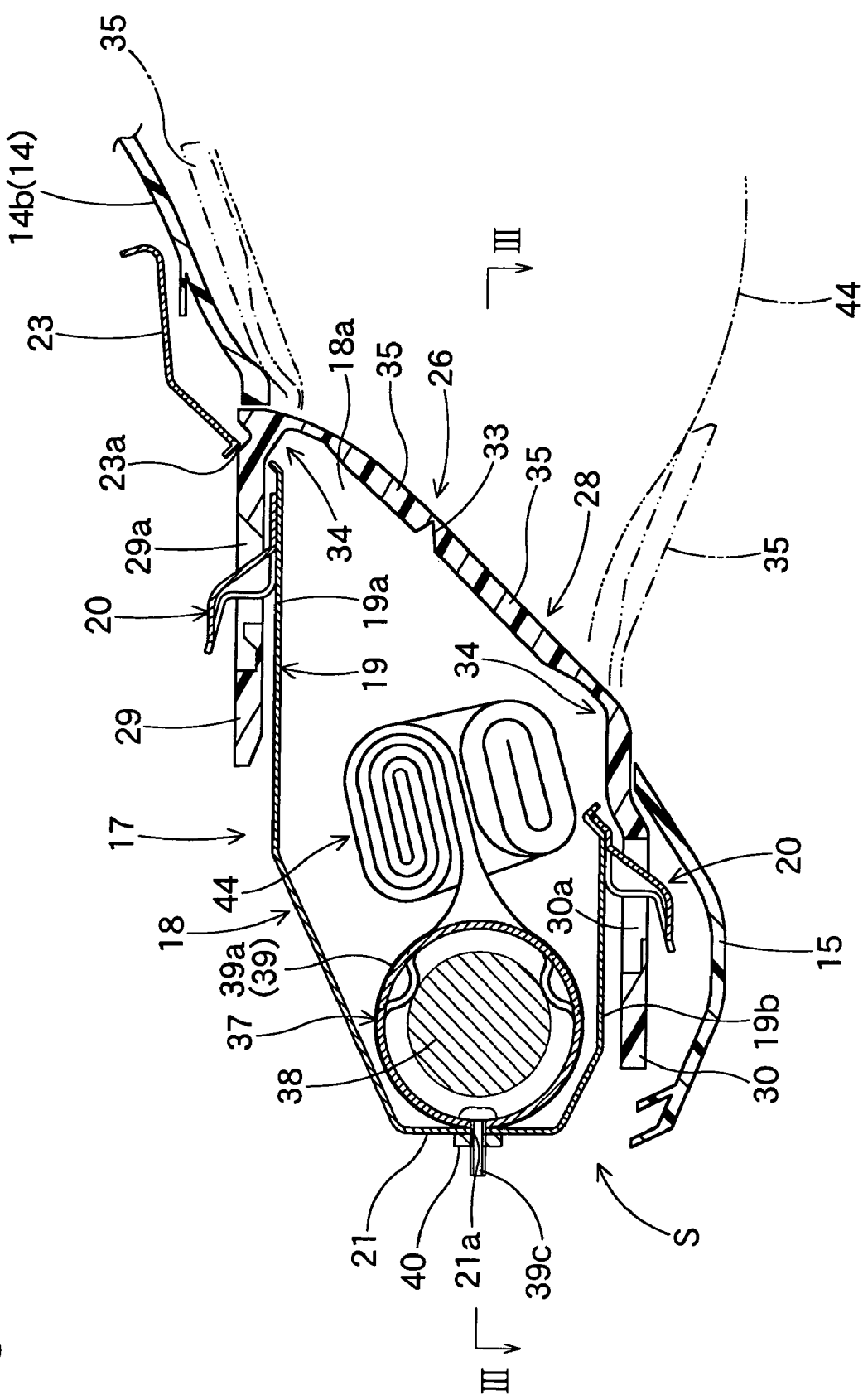
FIG. 2 is a schematic enlarged sectional view of the knee protection airbag apparatus in the longitudinal direction of the vehicle.
Figure 3:
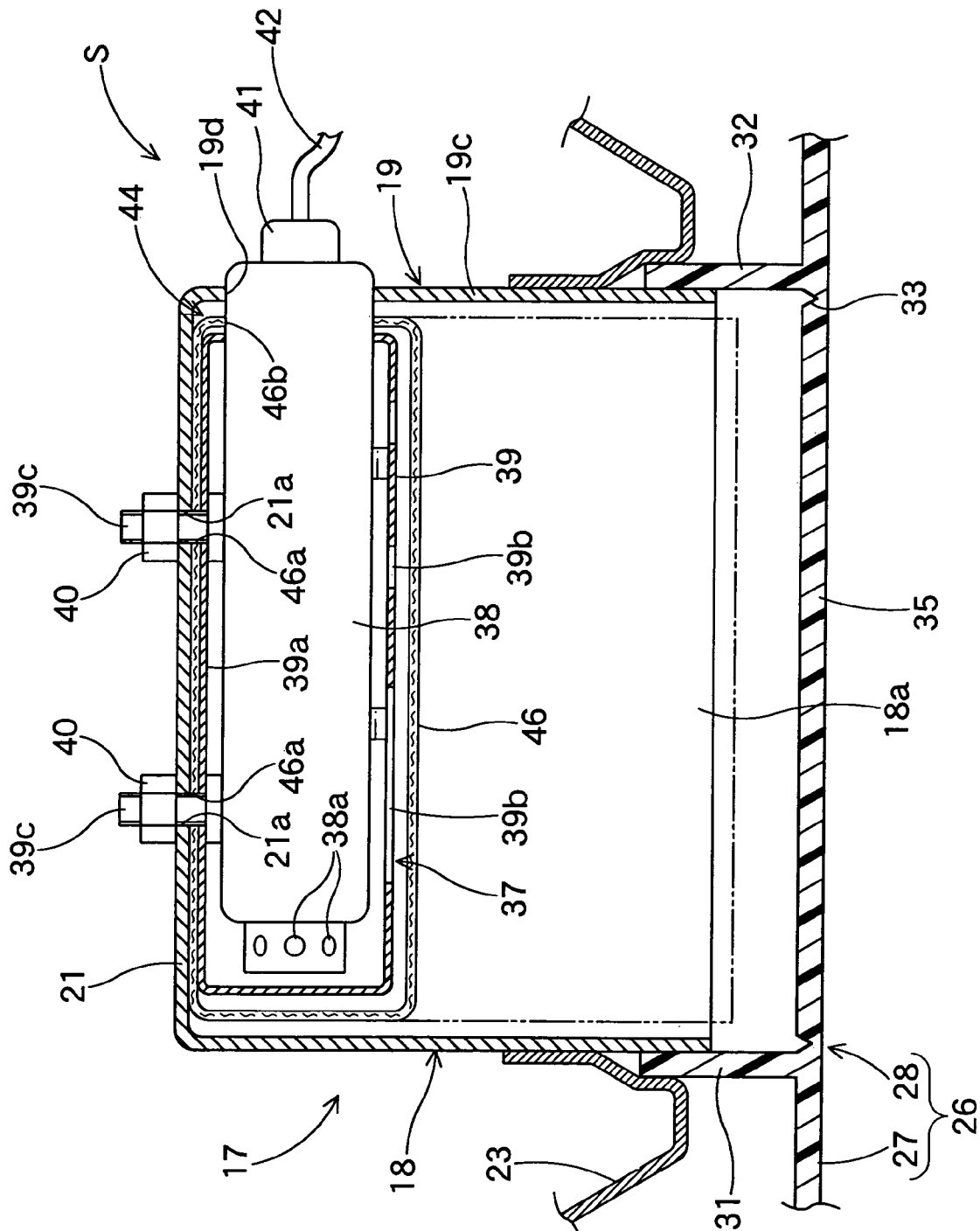
FIG. 3 is a schematic sectional view taken along a line III—III in FIG. 2.

The case 17 is formed of a sheet metal and is arranged below the steering column 9 as shown in FIGS. 2 to 4. The case 17 has a box-shaped main body portion 18 and a panel portion 23 extending outward from the vehicle-rear side of the main body portion 18. The main body portion 18 includes a peripheral wall portion 19 having a substantially rectangular cylindrical shape and a bottom wall portion 21 closing the vehicle front side of the peripheral wall portion 19. The main body portion 18 has a substantially rectangular opening 18a on the vehicle rear side. A plurality of engagement pawls 20 are arranged on the outer surface sides of wall portions 19a and 19b opposite each other in the vertical direction in the peripheral wall portion 19, respectively. The engagement pawls 20 are used for fitting upper and lower interconnection wall portions 29 and 30 of the airbag cover 26, described below, to the case 17. In this embodiment, the engagement pawls 20 are integral with the panel portion 23 but are formed separately from the main body portion 18. Each engagement pawl 20 has a substantially Z-shaped sectional shape. Each engagement pawl 20 is fitted into an engagement hole portion 29a, 30a of each interconnection wall portion 29, 30 of the airbag cover 26 and makes anchoring at the peripheral edges of the engagement holes portion 29a, 30a possible.

An insertion hole 19d is arranged in the side wall portion 19c of the peripheral wall portion 19 (see FIG. 3). This insertion hole 19d is used for inserting a later-appearing main body 38 of an inflator 37. Two insertion holes 21a for inserting bolts 39c of the inflator 37 are arranged in the bottom wall portion 21.

The panel portion 23 is separate from the main body portion 18. The panel portion 23 is formed in such a fashion as to encompass the periphery of the opening 18a of the case 17. Interconnection portions 24 are formed in the panel portion 23 as shown in FIG. 4. The interconnection portions 24 are used for interconnecting and fixing the case 17 to the body 1 of the vehicle. In this embodiment, the interconnection portions 24 are formed at two positions of the upper part of the main body portion 18, at the lower left corner, and close to the upper and lower right ends, five positions in total. Brackets 4, 5, 6 and 7 are arranged on the body 1 for interconnecting the interconnection portions 24 as shown in FIG. 4. The brackets 4 and 5 for interconnecting the interconnection portions 24A and 24B arranged on the upper side are interconnected to instrumental panel reinforcement 2 on the body 1 side. The brackets 6 and 7 for interconnecting the interconnection portions 24C and 24D, arranged on the lower side are interconnected to a center brace and a front body pillar that are not shown in the drawings. Furthermore, an insertion hole 23a for inserting the upper wall portion 29 of the airbag cover 26 is formed in the panel portion 23 as shown in FIG. 2.

The airbag cover 26 is formed of a thermoplastic elastomer such as an olefin type. The airbag cover 26 is so constituted as to be capable of covering the vehicle-rear side of the case 17 and is assembled to the case 17. The airbag cover 26 is arranged on the side of a lower panel 14b of the instrumental panel 14 including an upper panel 14a and the lower panel 14b. The airbag cover 26 includes a door arrangement portion 28 and a cover portion 27 arranged in the periphery of the door arrangement portion 28. The door arrangement portion 28 is arranged near the opening 18a of the case 17. The cover portion 27 is a portion that covers the vehicle rear side of the panel portion 23. The door arrangement portion 28 includes a door portion 35 and upper and lower and right and left sidewall portions 29, 30, 31 and 32 that are arranged by the periphery of the door portion 35.

The door portion 35 is shaped into a size a little greater than the opening 18a of the case 17 and has a substantially rectangular sheet shape covering the opening 18a. The door portion 35 in this embodiment is constituted by two doors that open in the vertical direction. Hinge portions 34 at the center of rotation when the door portion 35 is opened are arranged at the upper and lower edges of the door portion 35. A breakaway portion 33 is arranged at a substantially H-shaped portion around the door portion 35 when viewed from the vehicle-rear side.

The upper side wall portion 29, the lower side wall portion 30, the left side wall portion 31 and the right side wall portion 32 each are arranged close to the outer circumference of the peripheral wall portion 19 of the case main body 18 so as to protrude towards the front side of the vehicle. In this embodiment, the upper side wall portion 29 arranged close to the upper wall portion 19a of the peripheral wall portion 19 and the lower side wall portion 30 arranged close to the lower wall portion 19b are interconnection wall portions that connect the airbag cover 26 to the case 17. A plurality of engagement hole portions 29a, 30a for anchoring the engagement pawls 20 is formed in both the upper and lower side wall portions 29 and 30.

The inflator 37 is of a cylinder type the axial direction of which is arranged in the transverse direction of the vehicle as shown in FIGS. 2 and 3. The inflator 37 includes a main body having a shape of a substantially cylinder and a diffuser 39. A plurality of gas discharge ports 38a is arranged at one of the ends of the main body 38. A connector 41 to which a lead wire 42 for inputting an operation signal is connected to the other end of the main body 38. The diffuser 39 includes a holding cylinder portion 39a having a substantially cylindrical shape capable of surrounding the main body 38 and formed of a sheet metal and a plurality (two, in this embodiment) of bolts 39c protruding from the holding cylinder portion 39a. A plurality of gas outflow ports 39b is opened in the surface of the holding cylinder portion 39a on the vehicle-rear side when mounted. Each gas outflow port 39b discharges the inflating gas into the airbag 44 discharged from a gas discharge port 38a of the main body 38.

Incidentally, when an airbag operation circuit mounted to the vehicle detects front surface collision of the vehicle, an operation signal is inputted though a lead wire 42 to this inflator 37 with the airbag apparatus mounted to the steering wheel 8 and not shown in the drawing.

Figure 5:
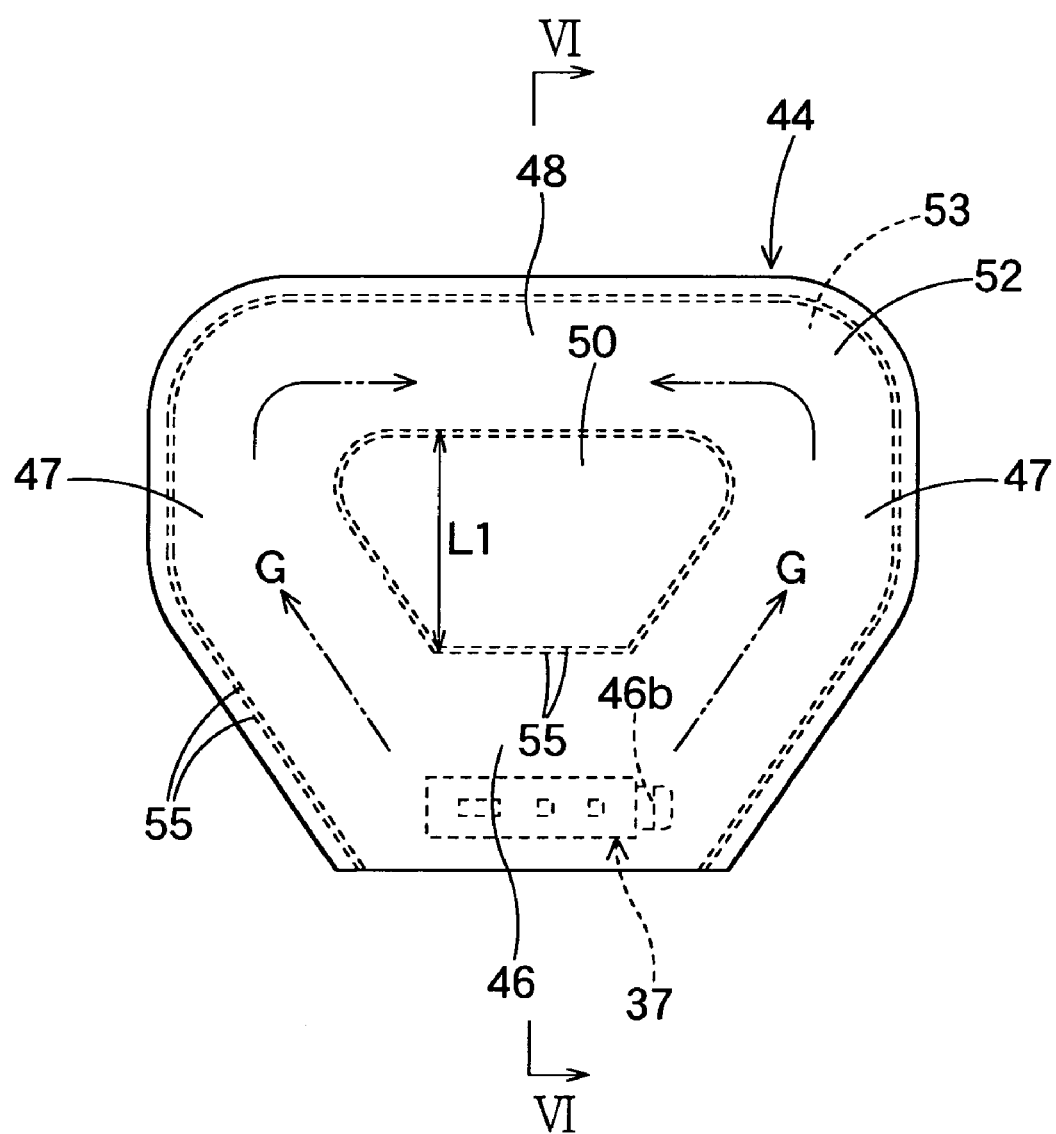
FIG. 5 is a front view of an airbag used in the embodiment.

The airbag 44 has a bag shape capable of inflation when the inflating gas is charged. In this embodiment, the airbag 44 is produced by sewing one woven fabric of polyester or polyamide yarns having flexibility. The shape of the airbag 44 when its inflation is completed is a substantially rectangular plate shape as shown in FIGS. 1, 4 and 5. The airbag 44 includes a passenger side wall portion 52 on the side of the driver MD and a body side wall portion 53 on the side of the column cover 13 each having a substantial fan shape. The airbag 44 comprises a mounting portion 46 on the lower edge, a knee protection inflation portion 48 arranged along to the transverse direction on the upper edge, two gas flow paths 47 for interconnecting the mounting portion 46 and the knee protection inflation portion 48, and a shin facing portion 50 arranged below the knee protection inflation portion 48. The mounting portion 46 is a portion at which the inflator 37 is accommodated. The gas flow paths 47 and 47 are arranged at both right and left edges of the airbag 44.

The mounting portion 46 is accommodated into the case main body portion 18 when inflation of the airbag 44 is completed. The mounting portion 46 is a portion that is held by the case main body portion 18 by utilizing the inflator 37. The knee protection inflation portion 48 is a portion that protects both knees KL and KR of the passenger MD when inflation of the airbag 44 is complete. The knee protection inflation portion 48 is arranged along almost the entire area in the transverse direction on the upper end side of the airbag 44. The gas flow paths 47 and 47 are arranged along both right and left edges of the airbag 44. The gas flow paths 47 and 47 allow the inflating gas G discharged from the inflator 37 to flow into the knee protection inflation portion 48 through the mounting portion 46.

Figure 6:
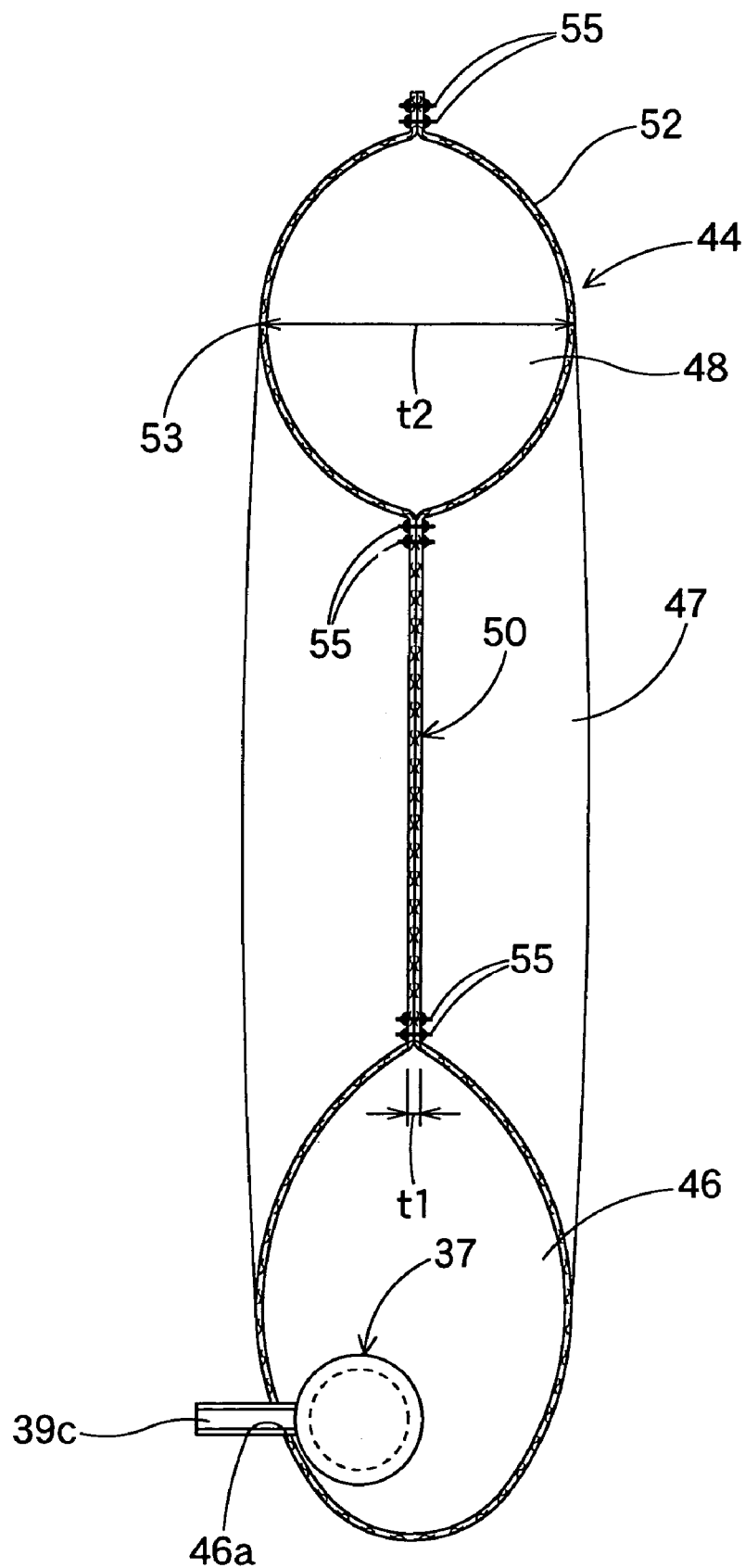
FIG. 6 is a schematic enlarged sectional view taken along a line VI—VI in FIG. 5.

In this embodiment, the shin facing portion 50 has a construction in which the passenger side wall portion 52 and the vehicle-front side wall portion 53 are joined to prevent the inflow of the inflating gas as shown in FIGS. 5 and 6. The shin facing portion 50 has a shape at the center of the airbag 44 substantially similar to the outer shape of the airbag 44 and is shaped substantially into a trapezoidal shape with its upper side (vehicle-rear side) being broad. In other words, in the airbag 44 in this embodiment, the mounting portion 46 is arranged at the lower side (vehicle-front side) of the shin facing portion 50, the knee protection inflation portion 48 is arranged on the upper side (vehicle-rear side) of the shin facing portion 50, and the gas flow paths 47 and 47 are arranged on both right and left sides of the shin facing portion 50, so that the inflation portion 45 encompasses the periphery of the shin facing portion 50. The shin facing portion 50 is so arranged in an area substantially extending in the vertical direction as to correspond to both shins of the passenger MD. In other words, the shin facing portion 50 is arranged at both shins L of the passenger MD, that is, near the positions where the shins L are arranged when the motion of both knees K of the passenger MD is impeded by the knee protection inflation potion 48, at the time of the inflation of the airbag 44 is complete. Incidentally, in this embodiment, the shin facing portion 50 is formed by sewing the periphery with sewing yarn 55 so as to join the passenger side wall portion 52 and the body side wall portion 53. In this embodiment, the shin facing portion 50 has a substantial trapezoidal shape the upper side (rear side) of which is broad. The width L1 of the shin facing portion 50 in the vertical direction (longitudinal direction) is set to a size that does not push the whole of the shins L of the passenger MD when the airbag 44 is inflated (see FIG. 5).

The airbag 44 in this embodiment is produced by the steps of folding back the material for the airbag blank at the portion corresponding to the lower edge of the airbag 44 and sewing all along the edges made opposite each other by folding back and also sewing the periphery of the shin facing portion 50, with sewing yarn 55.

Two insertion holes 46a and 46a and one insertion hole 46b are formed at the mounting portion 46 on the lower side of the body side wall portion 53 (see FIG. 3). The insertion holes 46a and 46a are for inserting the bolts 39c of the inflator 37. The insertion hole 46b is for inserting the main body 38 of the inflator 37. The airbag 44 is mounted to the case main body portion 18 in such a fashion that the main body portion 38 of the inflator 37 protrudes from the insertion hole 46b and the periphery of each insertion hole 46a is clamped between the holding cylinder portion 39a and the bottom wall portion 21 of the case main body portion 18.

Figure 7:
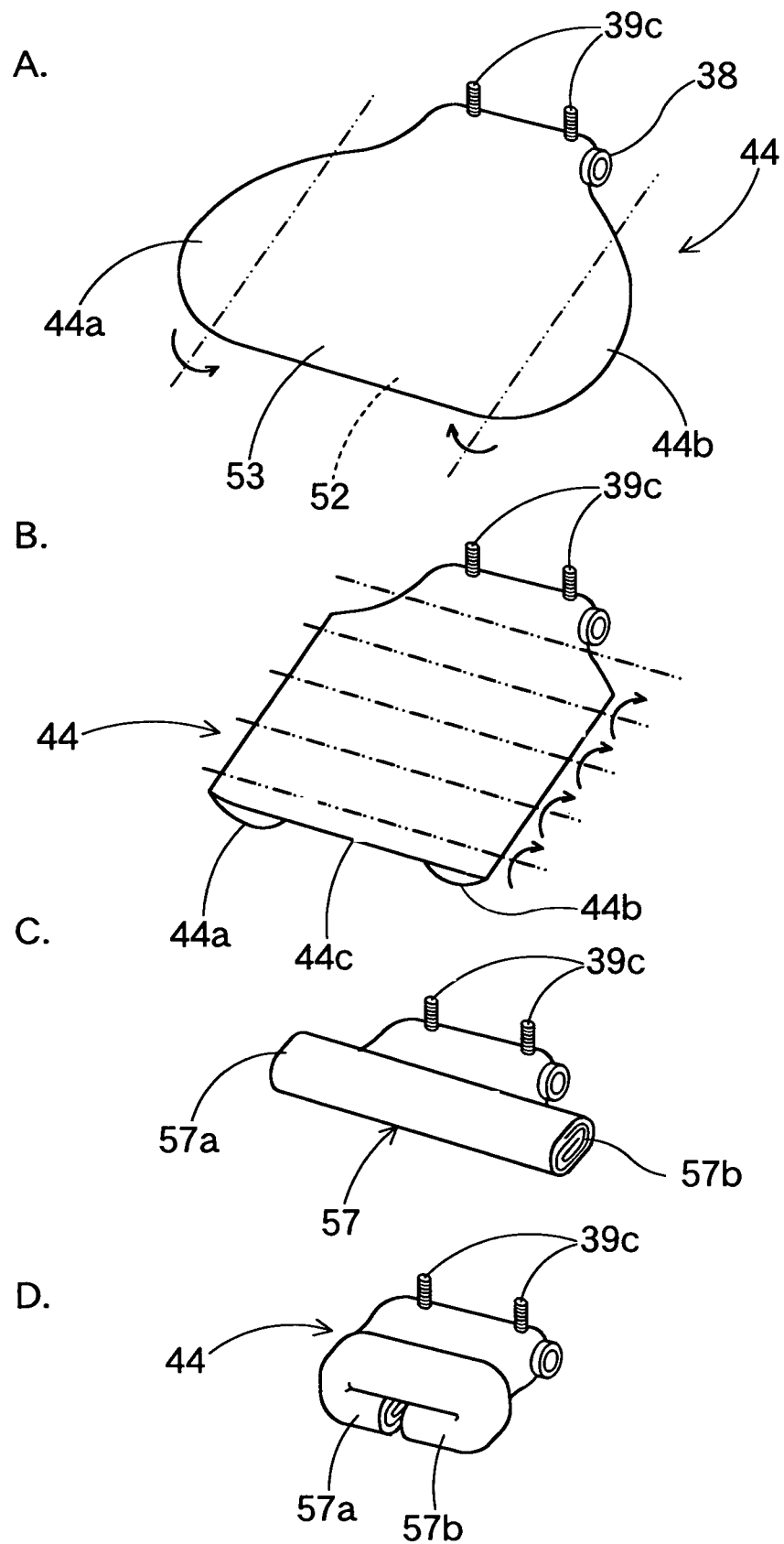
FIG. 7 is a schematic view showing a folded state of the airbag of the embodiment.

Next, mounting of the knee protection airbag apparatus S of this embodiment to the vehicle will be explained. First, the inflator 37 is accommodated in the airbag 44 in such a fashion that the bolt 39c and the end portion of the inflator main body 38 protrude from each of the insertion holes 46a and 46b. The airbag 44 is then folded. More concretely, from the state where the passenger side wall portion 52 and the body side wall portion 53 of the airbag 44 are laid one upon another and expanded flatly, the airbag 44 is folded at both right and left edges 44a and 44b over the passenger side wall portion 52 as shown in FIG. 7A. Next, as shown in FIGS. 7B and 7C, the airbag 44 is rolled and folded from its upper edge 44c with creases in the transverse direction over the body side wall portion 53. Both right and left edges 57a and 57b of the portion 57 that are thus rolled and folded are then folded over to the center of the passenger side wall portion 52 into the width capable of being accommodated in the case main body portion 18 as shown in FIG. 7D, and folding of the airbag 44 is thus completed. The airbag 44 is thereafter wrapped with a wrapping material that can be ruptured, for preventing unfolding. At this time, the bolt 39c of the inflator 37 and the end portion of the main body 38 protruding from the insertion holes 46a and 46b are allowed to protrude from the wrapping material.

Next, each bolt 39c of the inflator 37 is allowed to protrude from the insertion holes 21a. At the same time, the edge portion of the inflator main body 38 is allowed to protrude from the insertion hole 19d. Each bolt 39c protruding from the insertion hole 21 is fixed with a nut 40 and the inflator 37 is accommodated with the airbag 44 in the case main body 18.

The airbag cover 26 is then assembled to the case 17. More concretely, the upper wall portion 29 is inserted through the insertion hole 23a of the panel portion 23 and the airbag cover 26 is moved towards the case 17. The engagement pawls 20 are inserted into the engagement hole portions 29a and 30a of the upper and lower wall portions 29 and 30 and the engagement pawls 20 are anchored to the periphery of the engagement holes 29a and 30a. The airbag cover 26 can thus be assembled to the case 17.

Each interconnection portion 24 of the case 17 is fixed to the body 1 side by utilizing the brackets 4, 5, 6 and 7. At the same time, the connector 41 wired to the lead wire 42 is connected to the inflator main body 38. Thereafter the instrumental panel 14 and the undercover 15 (see FIGS. 1 and 2) are fitted and in this way, the airbag apparatus S can be mounted to the vehicle.

When the operation signal is inputted to the inflator main body 38 through the lead wire 42 after the airbag apparatus S is mounted to the vehicle, the inflating gas is discharged from the gas discharge port 38a of the inflator 37. The inflating gas then flows into the airbag 44 through the gas outflow port 39b of the diffuser 39. The airbag 44 inflates, ruptures the wrapping material not shown, pushes the door portion 35 of the airbag 26 and breaks the breakaway portion 33. The door portion 35 opens in the vertical direction with the hinge portion 34 as the center of rotation. The airbag 44 inflates from the opened door portion 35 as indicated by two-dot-chain line in FIGS. 1 and 4.

In the airbag apparatus S according to the embodiment, the shin facing portion 50 arranged in the area extending substantially in the vertical direction in such a fashion as to correspond to the shins L of both feet of the passenger MD is prevented from greatly inflating in the initial stage of inflation of the airbag 44. Therefore, even when the airbag 44 inflates under the state where the passenger MD is very close to the column cover 13 which is the body side portion of the vehicle, the shins L of the passenger MD are prevented from being unnecessarily pushed by the airbag 44. The gas flow paths 47 capable of causing the inflating gas G flowing into the lower portion (mounting portion 46) to flow towards the knee protection inflation portion 48 are arranged in the airbag 44 as shown in FIG. 5. For this reason, the knee protection inflation portion 48 arranged at the upper portion can quickly extend and expand without being affected by the shin facing portion 50. As a result, even when the passenger MD is very close to the column cover 13, the knee protection inflation portion 48 after completion of its inflation can stably protect the knees K of the passenger MD.

Therefore, the knee protection airbag apparatus S of this embodiment can stably protect the knees K of the passenger MD in addition to the effect that it can suppress unnecessary pushing of the shins L.

Figure 8:
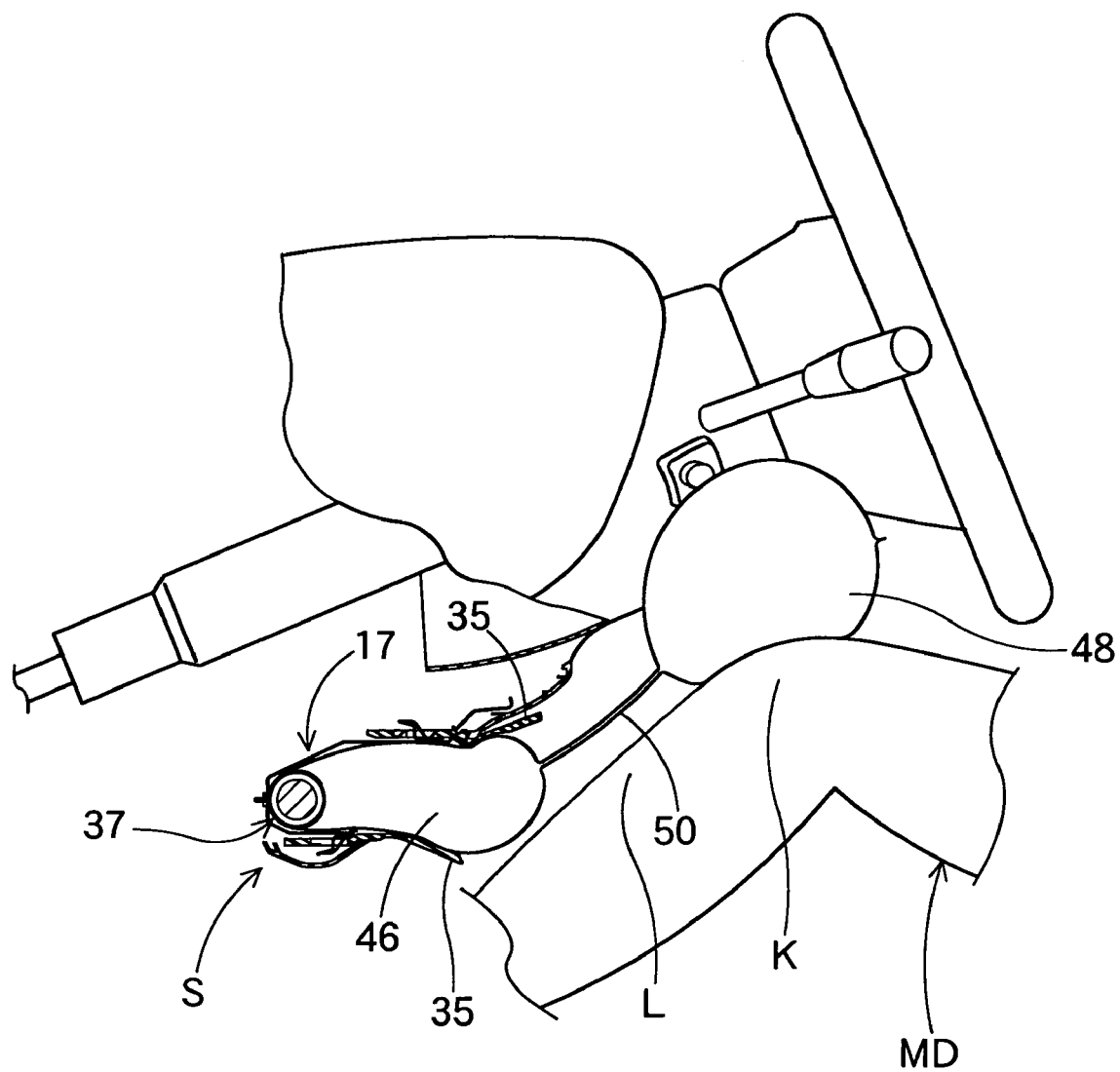
FIG. 8 is a schematic sectional view showing a completion state of inflation of the airbag in the knee protection airbag apparatus of the embodiment.

In the airbag apparatus S of this embodiment, the thickness t1 in the shin facing portion 50 at the time of completion of inflation is set to a value smaller than the thickness t2 of the knee protection inflation portion 48 (see FIG. 6). Therefore, when the motion of both knees K of the passenger MD is impeded by the knee protection inflation portion 48 of the airbag 44 after completion of inflation as shown in FIG. 8, the shin facing portion 50 does not unnecessarily push the shins L of the passenger MD even if the shin facing portion 50 impedes to the shins L of the passenger MD. In the airbag 44 of this embodiment, in particular, the shin facing portion 50 does not permit the inflow of the inflating gas G. Therefore, when the airbag 44 extends and expands, the excessive pressure on the shins L of the passenger MD can be further suppressed. As a result, the airbag 44 after completion of inflation does not push the shins L of the passenger MD but the knee protection inflation portion 48 can stably protect the knees K.

In the airbag apparatus S of this embodiment, the shin facing portion 50 that does not permit the inflow of the inflating gas is arranged inside the inflation region of the airbag 44. Therefore, the capacity of the airbag 44 can be reduced and the airbag 44 can quickly expand. In the airbag apparatus S of this embodiment, further, the shin facing portion 50 is arranged below the knee protection inflation portion 48 of the airbag 44. Therefore, in the initial stage of inflation of the airbag 44, the airbag 44 can extend between the passenger MD and the column cover 13 while the airbag 44 is thin. As a result, even when the gap between the knees K of the passenger MD and the column cover 13 is further small, the airbag 44 can smoothly extend into the narrow gap.

Incidentally, the airbag apparatus S according to this embodiment employs the construction in which the shin facing portion 50 arranged in the airbag 44 does not permit the inflow of the inflating gas by joining the passenger side wall portion 52 and the body side wall portion 53 with the sewing yarns 55. However, it is also possible to employ a construction in which the passenger side wall portion 52 and the body side wall portion 53 are bonded by using an adhesive, for example, so as to prevent the inflow of the inflating gas. The shape of the shin facing portion is not particularly limited to the shape of the shin facing portion 50 of the airbag 44 described above, either. For example, the portion of the base fabric corresponding to the shin facing portion and constituting the airbag may be cut off to form the shin facing portion. When the shin facing portion is formed by cutting of the base fabric, it is further possible to form an opening by cutting off only either one of the body side wall portion and the passenger side wall portion and to sew the peripheral edge of the opening to the wall portion of the other. Furthermore, the shin facing portion may well be formed by cutting off both wall portions. To control the extending direction of the knee protection inflation portion at the time of extension and expansion of the airbag, the shin facing portion is preferably arranged in such a fashion as to interconnect the mounting portion and the knee protection inflation portion. When the shin facing portion is opened by cutting off the base fabric of both body side wall portion and passenger side wall portion, an interconnection fabric that interconnects a portion near the center of the mounting portion in the transverse direction and a portion near the center of the knee protection inflation portion is preferably arranged separately.

Figure 9:
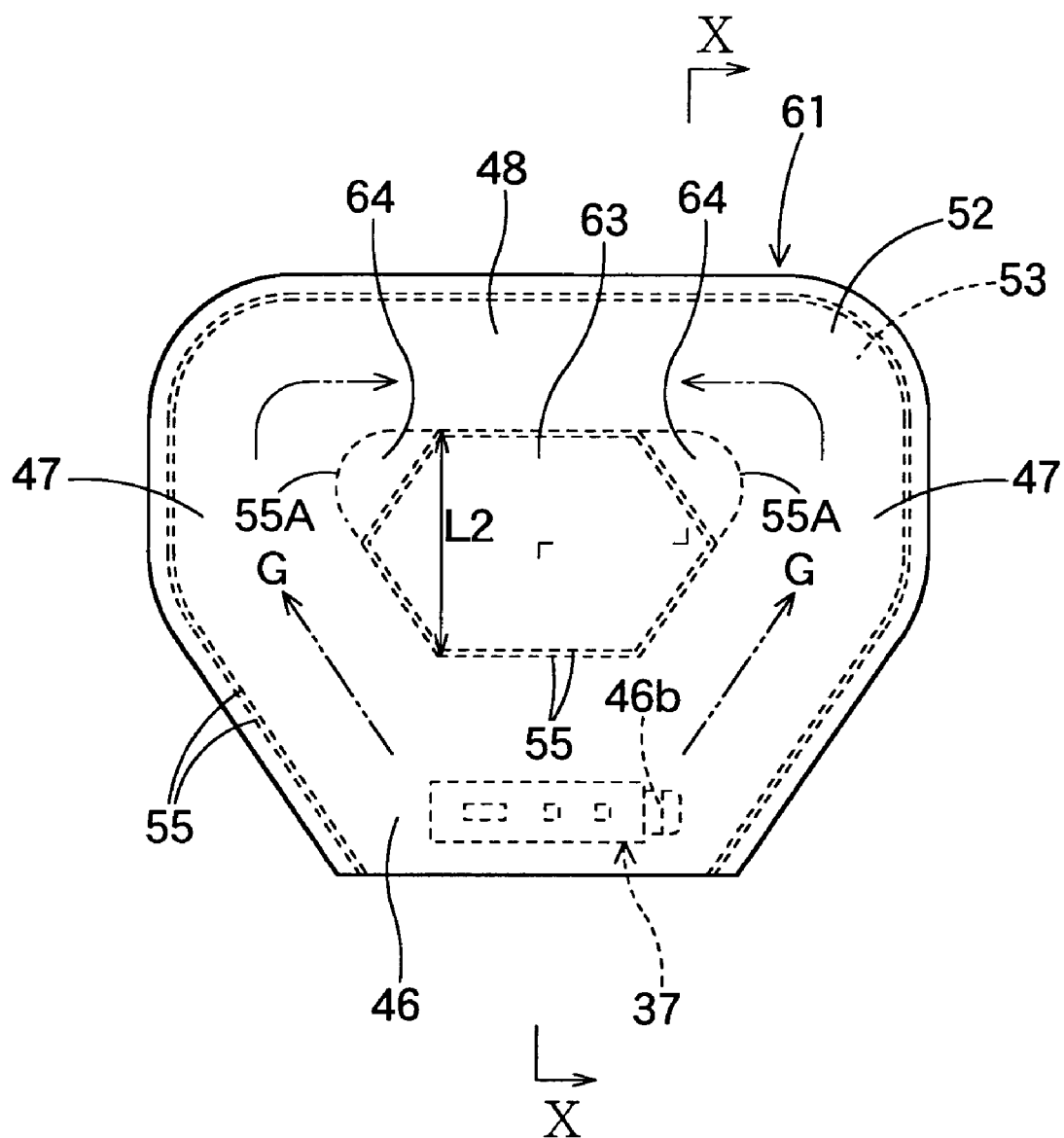
FIG. 9 is a front view of an airbag according to another embodiment of the invention.
Figure 10:
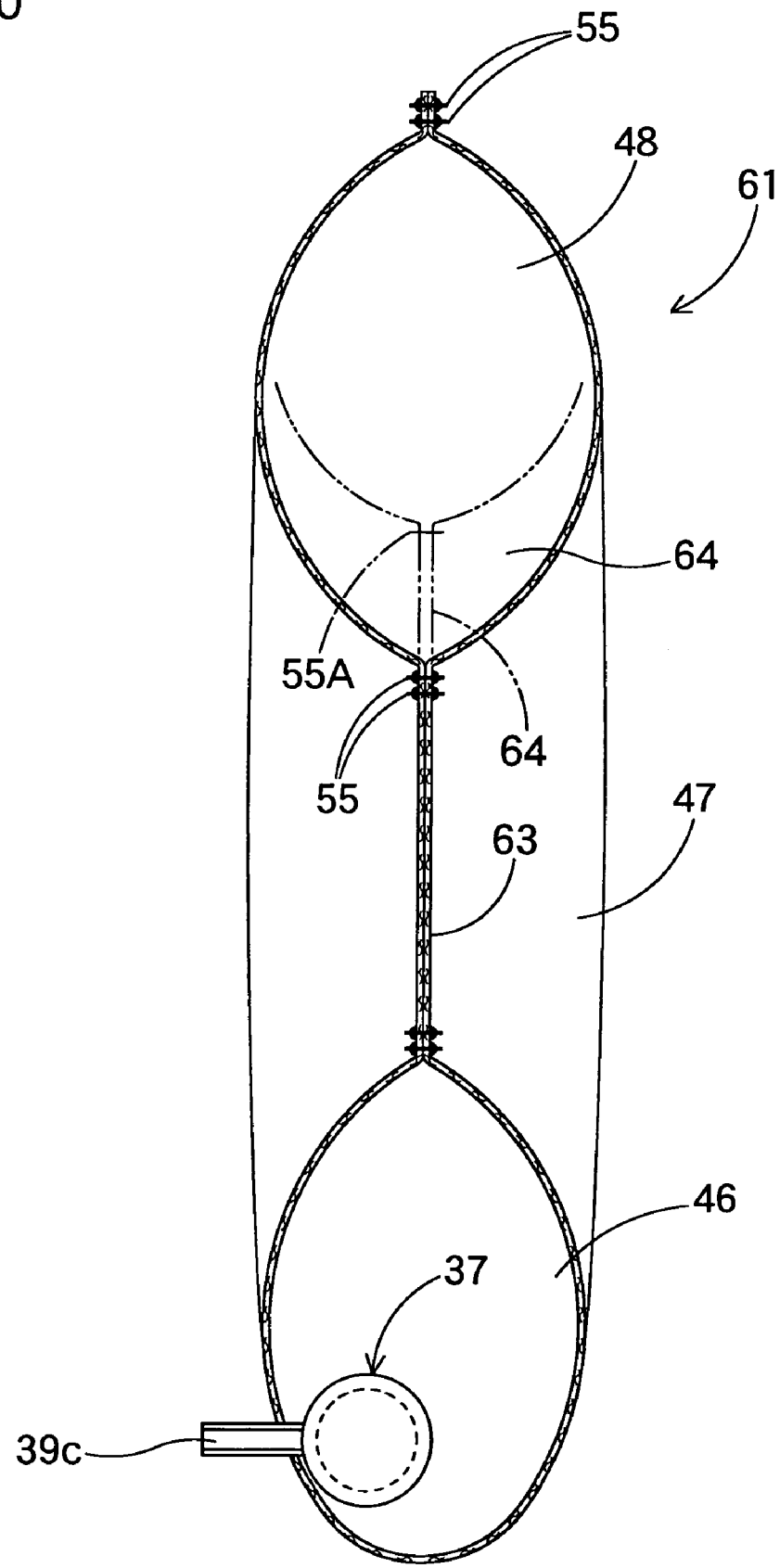
FIG. 10 is a schematic enlarged sectional view taken along a line X—X of FIG. 9 and shows a state after inflation of an auxiliary inflation portion.

An airbag having a construction shown in FIGS. 9 and 10 may be used as the airbag 61. The airbag 61 has the same construction as the airbag 44 described above with the exception of the shin facing portion 63 and the auxiliary inflation portions 64. Therefore, like reference numerals are allocated and the explanation will be omitted. In this airbag 61, too, the shin facing portion 63 has a construction in which its peripheral portions of the passenger side wall portion 52 and the body side wall portion 53 are joined by using the sewing yarns 55 so as to prevent the inflow of the inflating gas. The width L2 of the shin facing portion 63 in the vertical direction (longitudinal direction) is set to a width so that the airbag does not push the whole of the shins L of the passenger MD when the airbag 61 is inflated (see FIG. 9).

In the airbag 61 of this embodiment, the auxiliary inflation portions 64 are arranged between the shin facing portion 63 and the knee protection inflation portion 48 as shown in FIG. 9. These auxiliary inflation portions 64 are arranged adjacent to the knee protection inflation portion 48. In the initial stage of inflation of the airbag 61, the auxiliary inflation portions 64 fold out but does not allow the inflow of the inflating gas. When the internal pressure of the airbag 61 elevates, the auxiliary inflation portions 64 permit the inflow of the inflating gas from the knee protection inflation portion 48 and inflate. In this embodiment, the auxiliary inflation portions 64 are formed into a substantial triangular shape at two positions on both right and left ends on the rear end (upper end) side of the shin facing portion 63. The periphery of each auxiliary inflation portions 64 on the side of the knee protection inflation portion 48 is sewed by the sewing yarns 55A so as to join the passenger side wall portion 52 and the body side wall portion 53. When the internal pressure of the airbag 61 exceeds a predetermined pressure, the sewing yarns 55A are broken with the result that the inflating gas from the knee protection inflation portion 48 can flow into the auxiliary inflation portions 64. It is of course possible to employ the construction in which the passenger side wall portion 52 and the body side wall portion 53 are bonded with an adhesive, or the like, in place of the sewing yarns 55A so that each auxiliary inflation portion 64 can be released from its periphery when the internal pressure exceeds the predetermined pressure.

In the airbag apparatus using the airbag 61 described above, when the motion of the knees of the passenger is impeded by the knee protection inflation portion 48 of the airbag 61 after completion of its inflation and the internal pressure of the airbag 61 elevates, the inflating gas inside the knee protection inflation portion 48 can be escaped into the auxiliary inflation portions 64 and 64. Therefore, it becomes possible to prevent the inflated knee protection inflation portion 48 from unnecessarily pushing the knees of the passenger. As a result, the knee protection inflation portion 48 can further stably protect the knees of the passenger.

Figure 11:
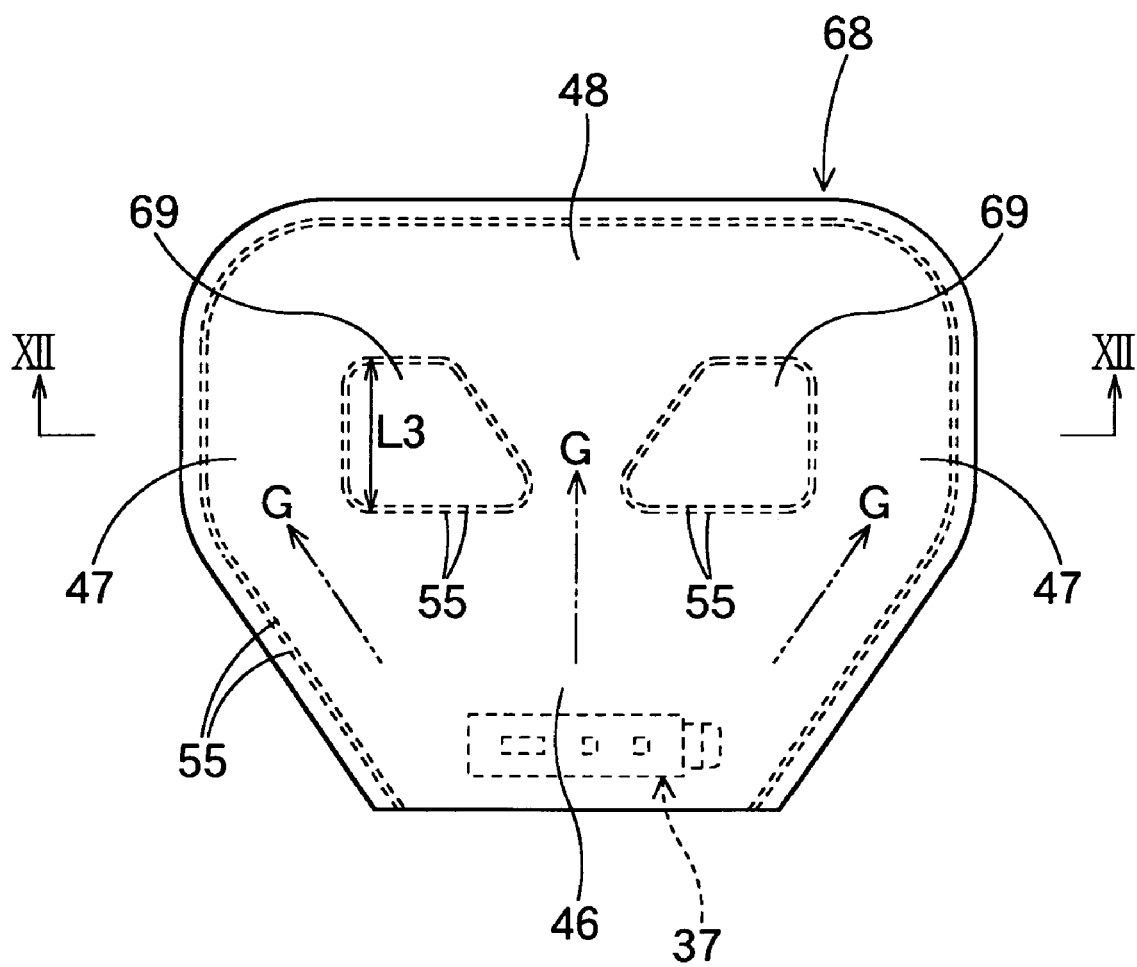
FIG. 11 is a front view of an airbag according to still another embodiment of the invention.
Figure 12:
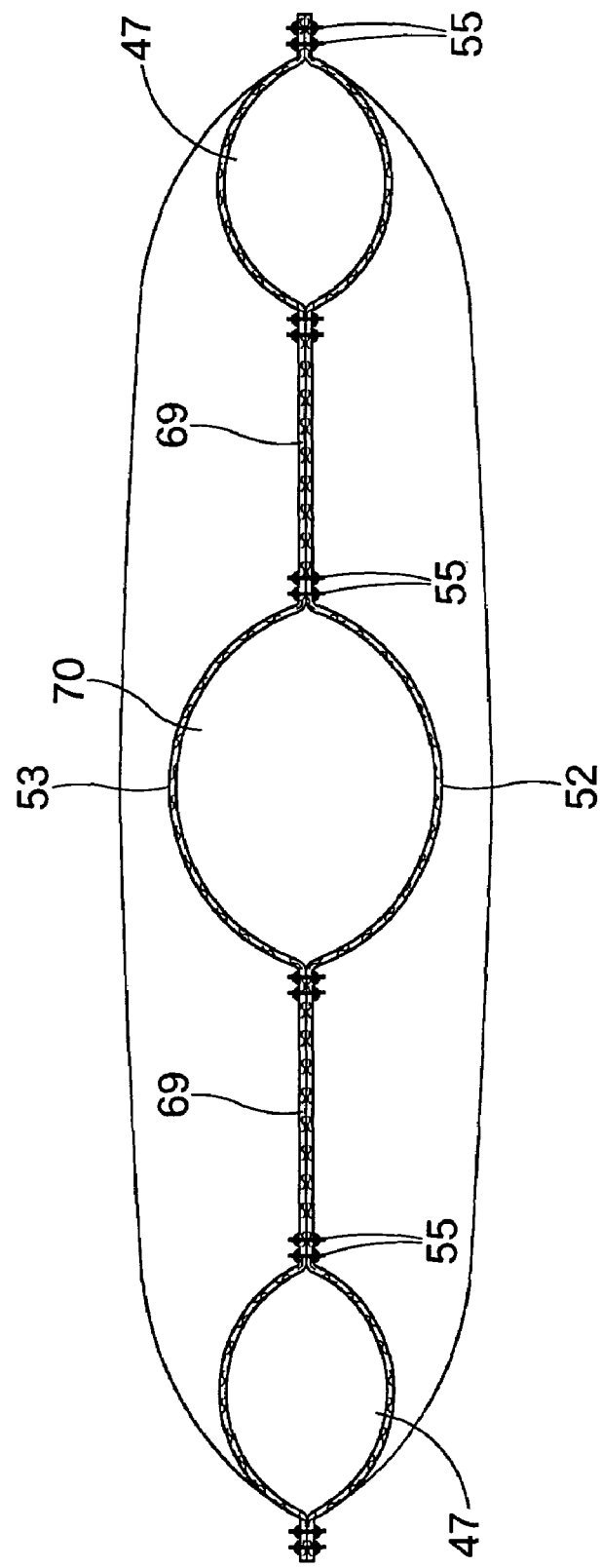
FIG. 12 is a schematic enlarged sectional view taken along a line XII—XII in FIG. 11.

An airbag having a construction shown in FIGS. 11 and 12 may be used as the airbag 68. This airbag 68 has the same construction as that of the airbag 44 described above with the exception of the shin facing portions 69 and a center gas flow path 70. Therefore, the same reference numerals are allocated and the explanation will be omitted. In the airbag 68, the shin facing portions 69 are arranged at two separate positions corresponding to both right and left shins inside the area of the inflation portion 45 as shown in FIG. 11. Each shin facing portion 69 has a shape of a substantial right-angled triangle with its oblique side positioned inside. The two shin facing portions 69 are arranged symmetrically with each other in such a fashion that the gap between these two oblique sides increases going upward (rearward). The shin facing portions 69 are fabricated by joining those portions which are to become the peripheral portions of the passenger side wall portion 52 and the body side wall portion 53 with the sewing yarns 55 to prevent the inflow of the inflating gas in the same way as the shin facing portions 50 and 63 in the airbags 44 and 61 described above. The width L3 of each shin facing portion 69 in the vertical direction (longitudinal direction) is set to a width so that each shin facing portions 64 does not push the whole of each shins L of the passenger MD when the airbag 68 inflates (see FIG. 11).

The portion between the shin facing portions 69 forms the center gas flow path 70 which directs the inflating gas that has flowed into the lower part of the airbag 68 (mounting portion 46) to the knee protection inflation portion 48. The center gas flow path 70 is so arranged as to interconnect the mounting portion 46 and the knee protection inflation portion 48 passing through the transverse center.

In the airbag apparatus using the airbag 68 having the construction described above, the inflating gas flowing into the airbag 68 flows into the knee protection inflation portion 48 through the center gas flow path 70 arranged between the shin facing portions 69 and 69. Therefore, in comparison with the airbags 44 and 61 described above in which the shin facing portions are not separated to the right and left, the inflating gas can be charged more quickly into the knee protection inflation portion 48 and the airbag 68 can be more quickly expanded. In the airbag 68 having the construction described above, the center gas flow path 70, too, inflates as the inflating gas flows. Therefore, the airbag 68 inflates with a greater thickness than the airbags 44 and 61 described above.

In this airbag 68, the center gas flow path 70 arranged adjacent to each other in the transverse direction of the shin facing portions 69 inflates, too, as the inflating gas flows in. When this airbag 68 is used for the knee protection airbag apparatus for the driver's seat, however, the center gas flow path 70 expands in such a fashion as to cover the vehicle-rear side of the column cover 13 near the center in the transverse direction. Both legs of the passenger do not much move in the transverse direction in the driver's seat, because the column cover 13 is so arranged as to protrude toward vehicle rear side at the transverse center. When inflation of the airbag 68 is complete, the center gas flow path 70 after inflation does not put excess pressure on the shin L of the driver MD and the airbag 68 can be suitably used for the knee protection airbag apparatus for the driver's seat.

Figure 13:
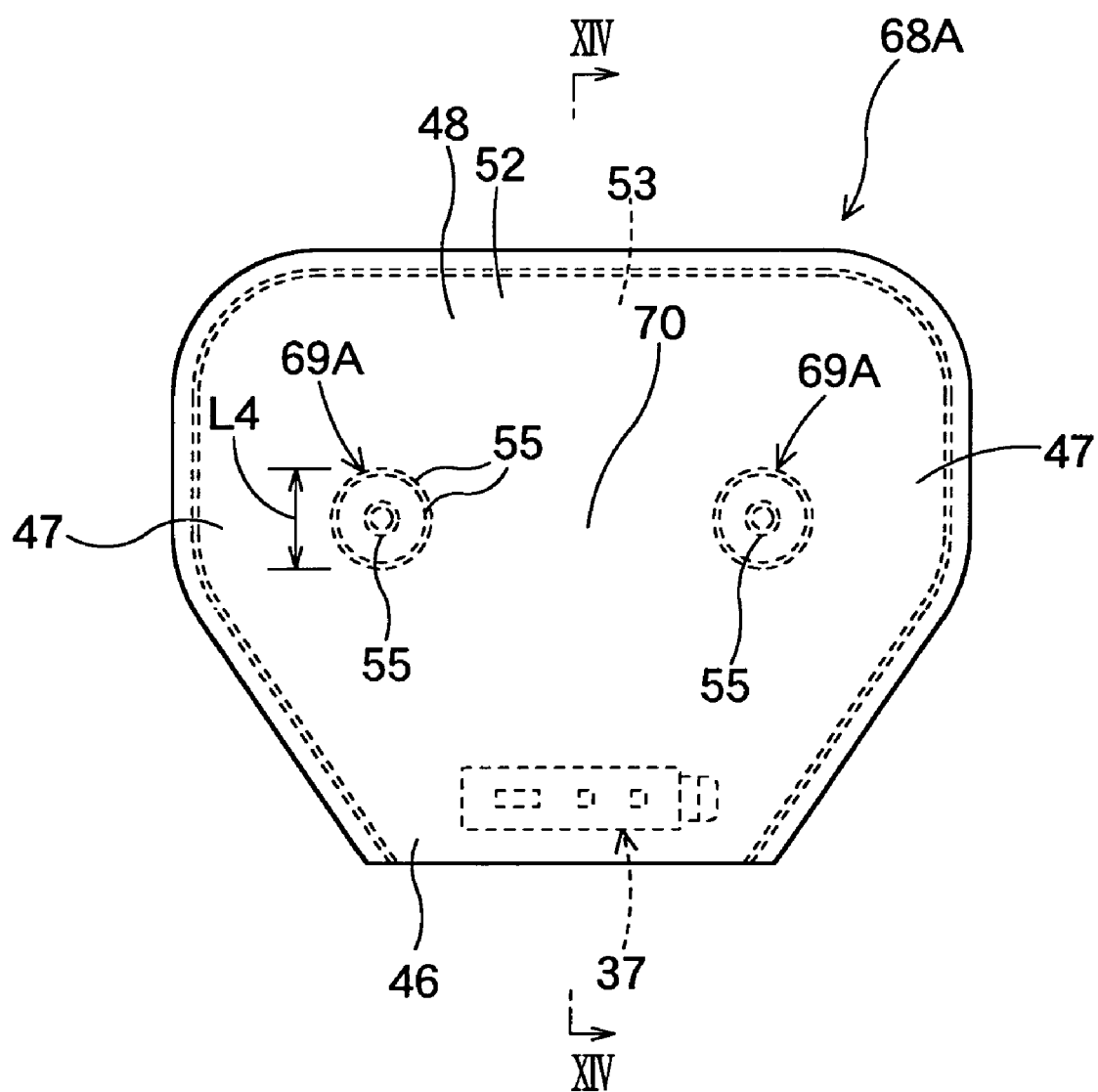
FIG. 13 is a front view of an airbag according to still another embodiment of the invention.
Figure 14:
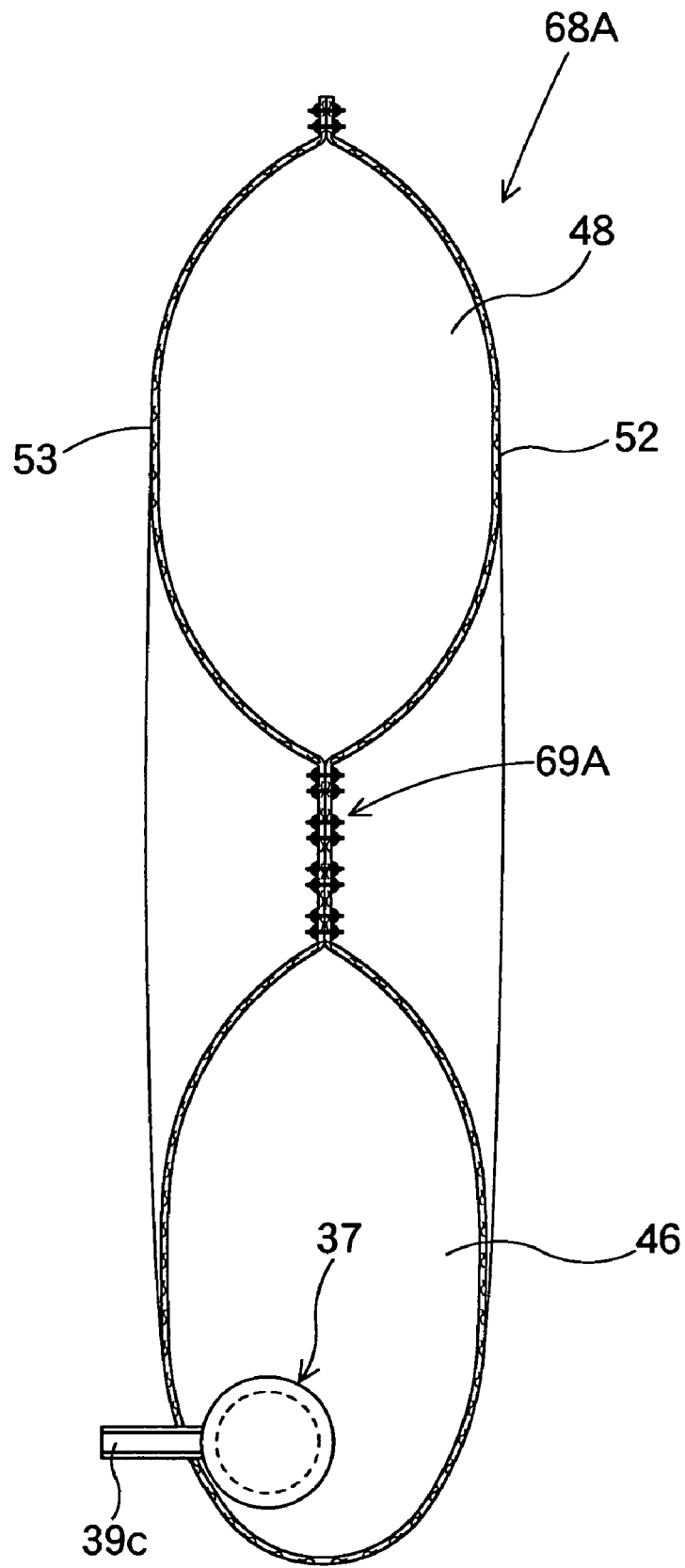
FIG. 14 is a schematic enlarged sectional view taken along a line XIV—XIV in FIG. 13.

An airbag the shin facing portions 69A of which are substantially circular may be used as the airbag 68A (see FIGS. 13 and 14). Each shin facing portion 69A has a construction in which the passenger side wall portion 52 and the body side wall portion 53 are sewed with the sewing yarns 55 not only around its periphery but also its inside. The width L4 of each shin facing portion 69A in the vertical direction (longitudinal direction) is set to a width so that each shin facing portion 69A does not push the whole of each shins L of the passenger MD when the airbag 68 extends and expands (FIG. 13).

Figure 15:
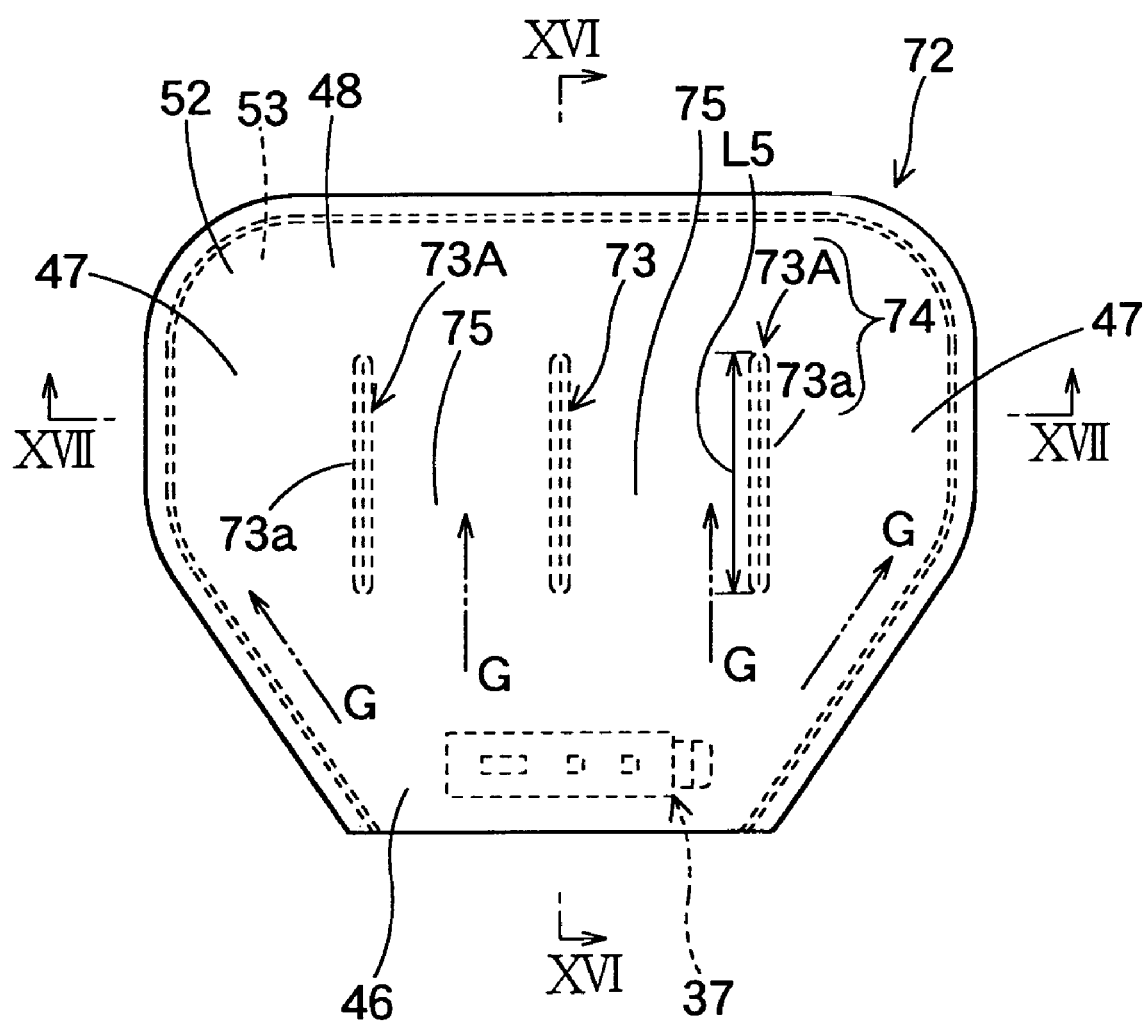
FIG. 15 is a front view of an airbag according to still another embodiment of the invention.
Figure 16:
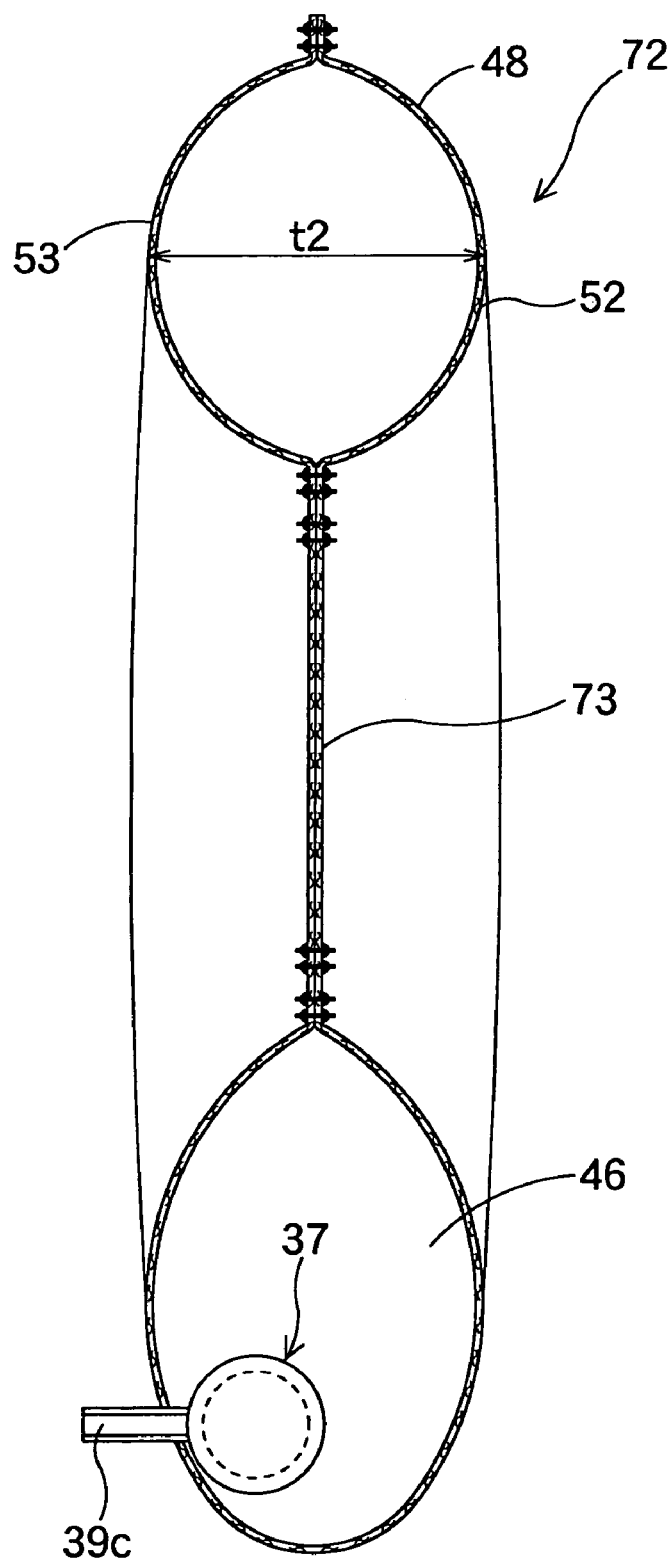
FIG. 16 is a schematic enlarged sectional view taken along a line XVI—XVI in FIG. 15.
Figure 17:
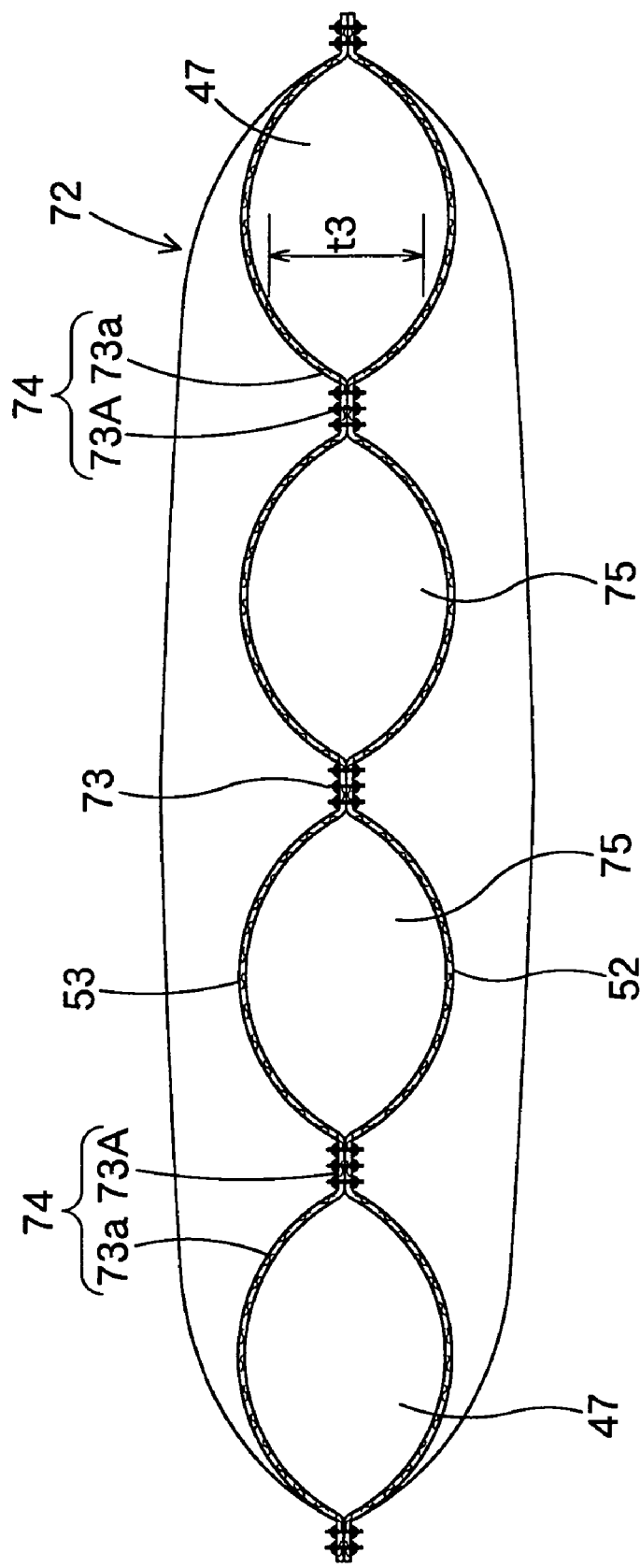
FIG. 17 is a schematic enlarged sectional view taken along a line XVII—XVII in FIG. 15.

When the construction in which the center gas flow path is arranged inside the airbag is employed, three partition portions 73 having a construction in which the passenger side wall portion 52 and the body side wall portion 53 are joined with the sewing yarns 55 inside the inflation area of the airbag 72 to inhibit the inflow of the inflating gas may be arranged at three positions in the transverse direction as shown in FIGS. 15 to 17. In this case, the portions between the adjacent partition portions 73 operate as the center gas flow paths 75. In other words, the airbag 72 comprises two center gas flow paths 75. This airbag 72 has substantially the same construction as that of the airbag 44 described above with the exception of the partition portions 73 and the center gas flow paths 75. Therefore, the same reference numerals are allocated and the explanation will be omitted.

Each partition portion 73 has a belt shape extending in the vertical direction (longitudinal direction) as shown in FIG. 15. The partition portions 73A and 73A arranged on both right and left sides and their peripheral portions 73a operate as the shin facing portions 74 in this embodiment. The width L5 of each shin facing portions 74 in the vertical direction (longitudinal direction) is set to a width so that each shin facing portions 74 does not push the whole of each shins L of the passenger MD when the airbag 72 extends and expands (see FIG. 15). The thickness t3 of each shin facing portions 74 after completion of inflation is set smaller than the thickness t2 of the knee protection inflation portion 4 (see FIGS. 16 and 17). The portions between the adjacent shin facing portions 74 and 74 operate as the center gas flow paths 75 and 75 capable of flowing out the inflating gas flowing into the lower portion of the airbag 72 (mounting portion 46) towards the knee protection inflation portion 48.

Incidentally, the airbag 72 has the construction in which the partition portions 73 are arranged at three positions and the center gas flow paths 75 are arranged at two positions between the adjacent partition portions 73. However, the number of the partition portions 73 and the number of the center gas flow paths 75 are not particularly limited to these numbers. For example, two or more than four partition portions 73 may be arranged.

Figure 18:
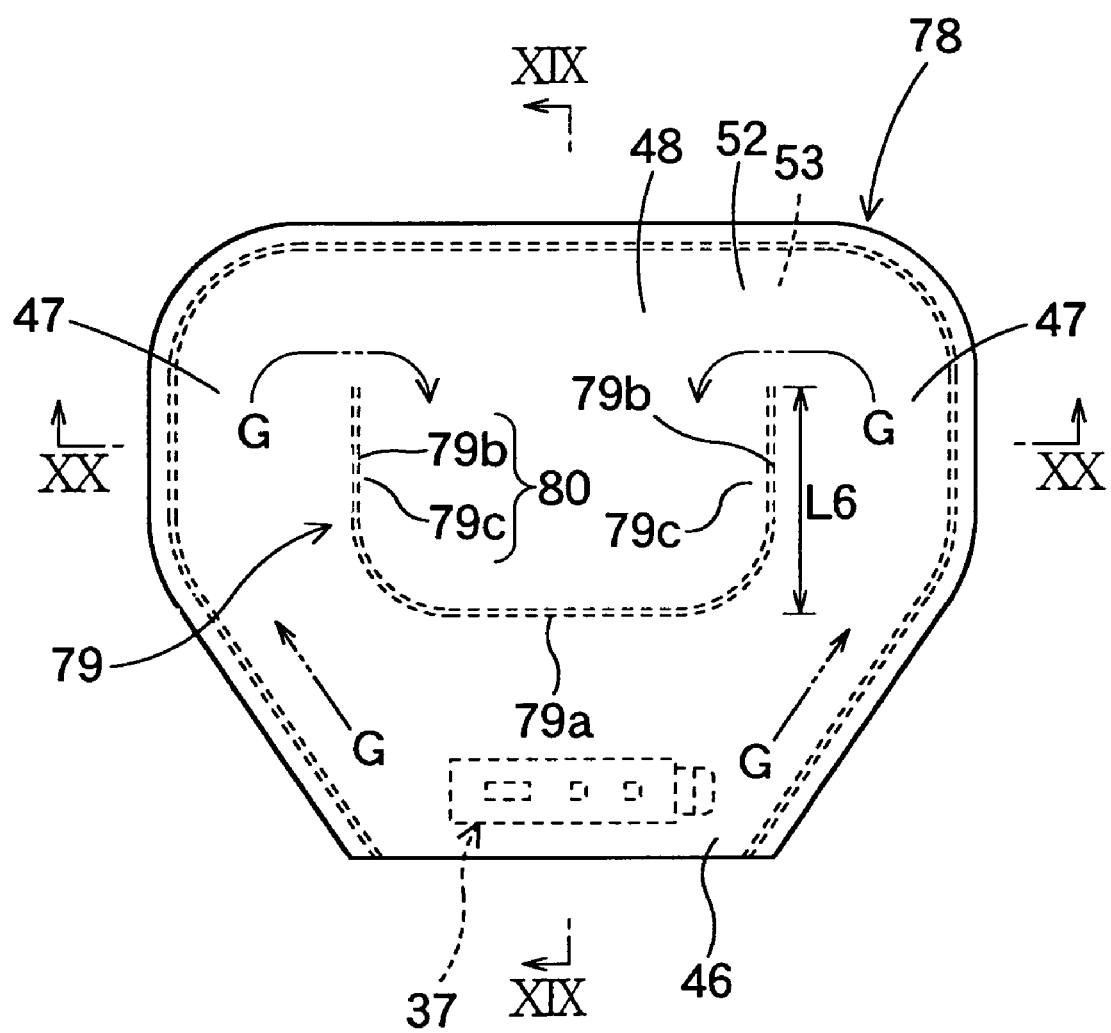
FIG. 18 is a front view of an airbag according to still another embodiment of the invention.
Figure 19:
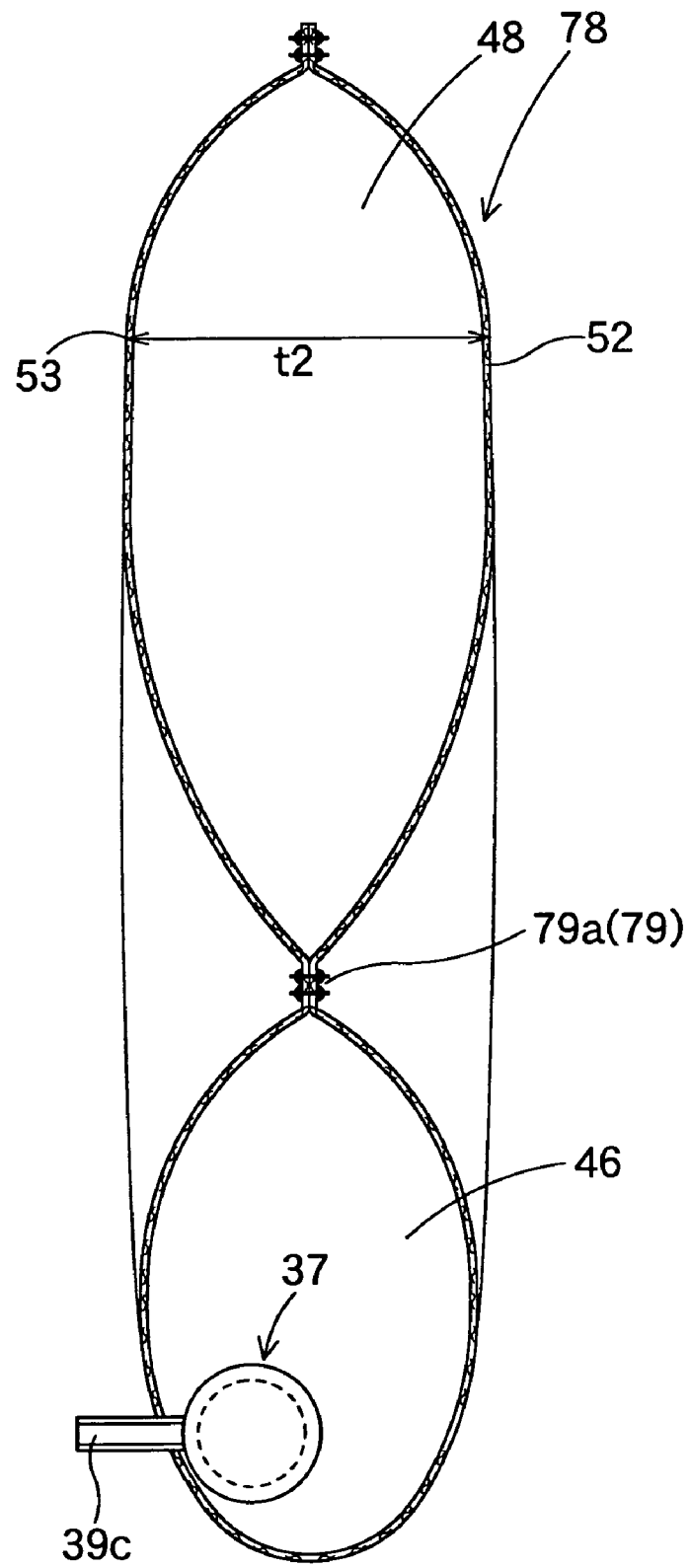
FIG. 19 is a schematic enlarged sectional view taken along a line XIX—XIX in FIG. 18.
Figure 20:
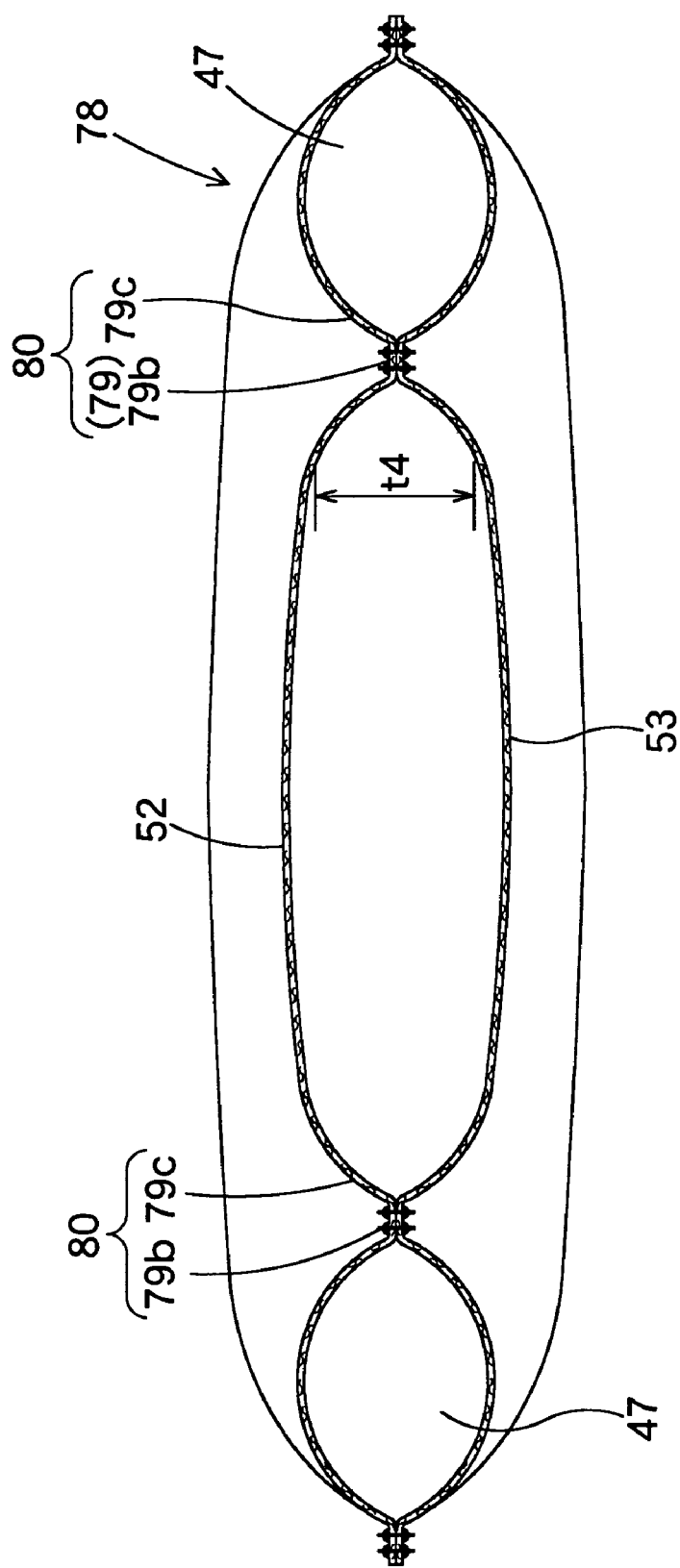
FIG. 20 is a schematic enlarged sectional view taken along a line XX—XX in FIG. 18.

An airbag having a construction shown in FIGS. 18 to 20 may be used as the airbag 78. The airbag 78 has the construction including the partition portion 79 formed by joining the passenger side wall portion 52 and the body side wall portion 53 through the sewing yarns 55 inside the inflation area. The construction is the same as that of the airbag 44 described above with the exception of the partition portion 79. Therefore, the same reference numerals are allocated and the explanation will be omitted.

The partition portion 79 has a U shape. The partition portion 79 includes a transverse rod portion 79a and two longitudinal rod portions 79b. The transverse rod portion 79a is so arranged as to extend to the right and left at close to the center in the front-and-rear direction (vertical direction). The longitudinal rod portions 79b are so arranged as to extend from both right and left ends of the transverse rod portion 79a in the rear direction (in upward direction). In this embodiment, portions between right and left edges 78a, 78b of the airbag 78 and the longitudinal rod portions 79b constitute the gas flow paths 47 and 47, respectively. In the airbag 78, each longitudinal rod portion 79b in the partition portion 79 and its peripheral portion 79c operate as the shin facing portion 80. The width L6 of each shin facing portions 80 in the vertical direction (longitudinal direction) is set to a width so that each shin facing portions 80 does not push the whole of each shins L of the passenger MD when the airbag 78 extends and expands (see FIG. 18). The thickness t4 of the shin facing portion 80 at the time of completion of inflation is set smaller than the thickness t2 of the knee protection inflation portion 48 (see FIGS. 19 and 20).

Figure 21:
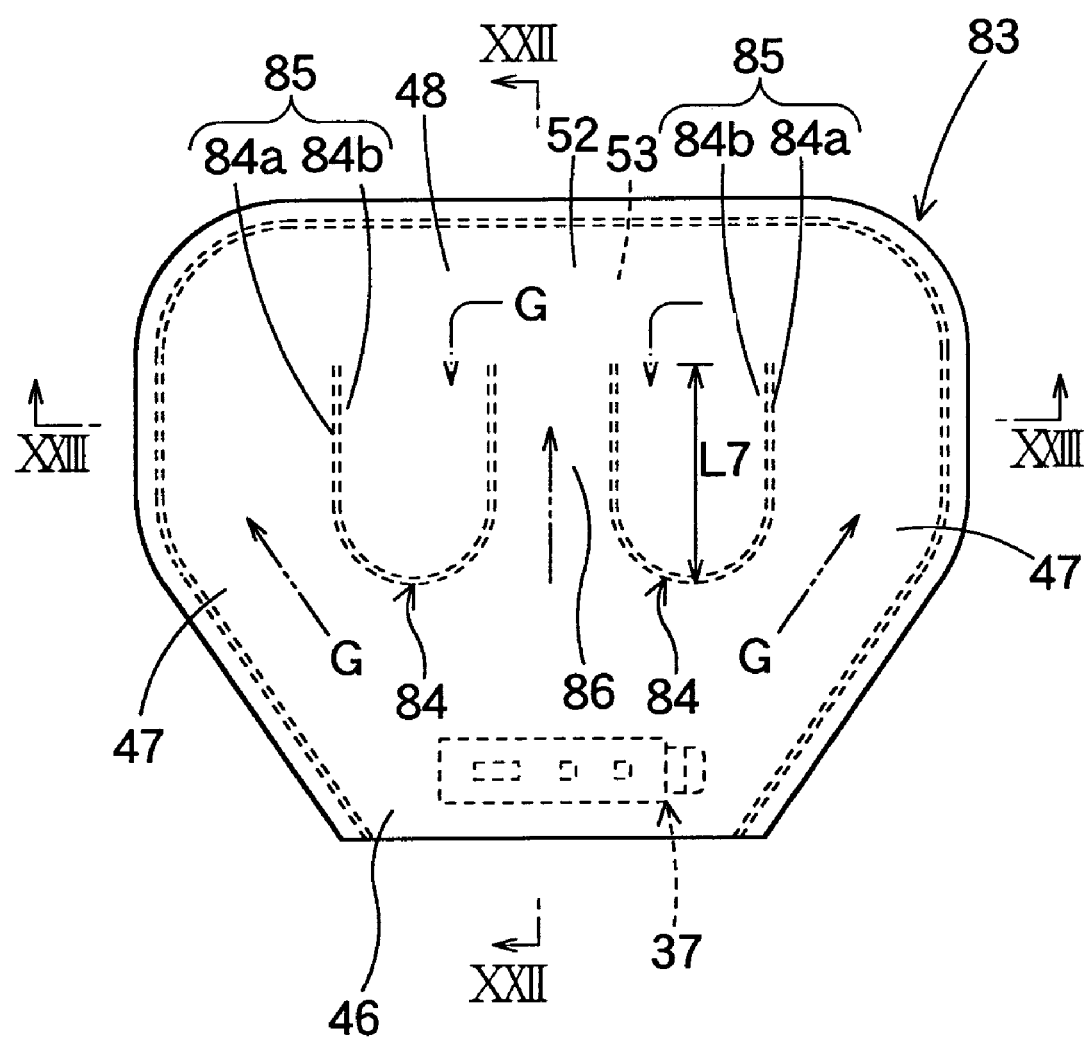
FIG. 21 is a front view of an airbag according to still another embodiment of the invention.
Figure 22:
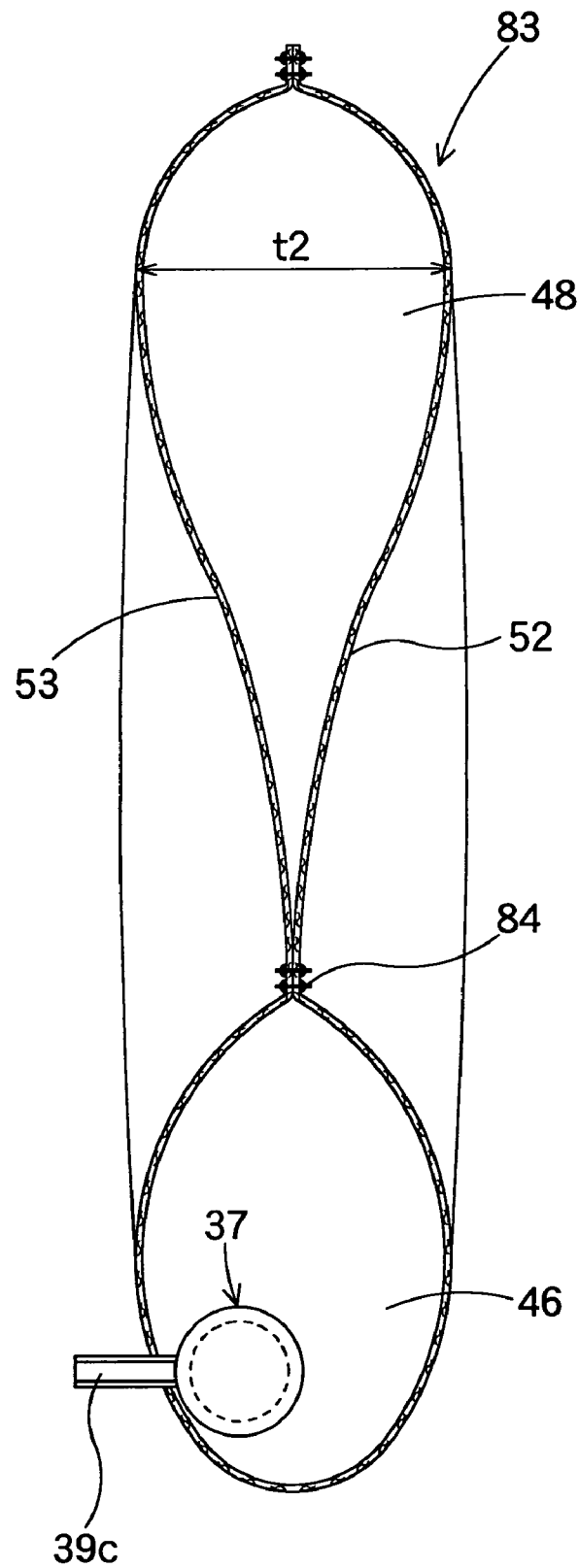
FIG. 22 is a schematic enlarged sectional view taken along a line XXII—XXII in FIG. 21.
Figure 23:
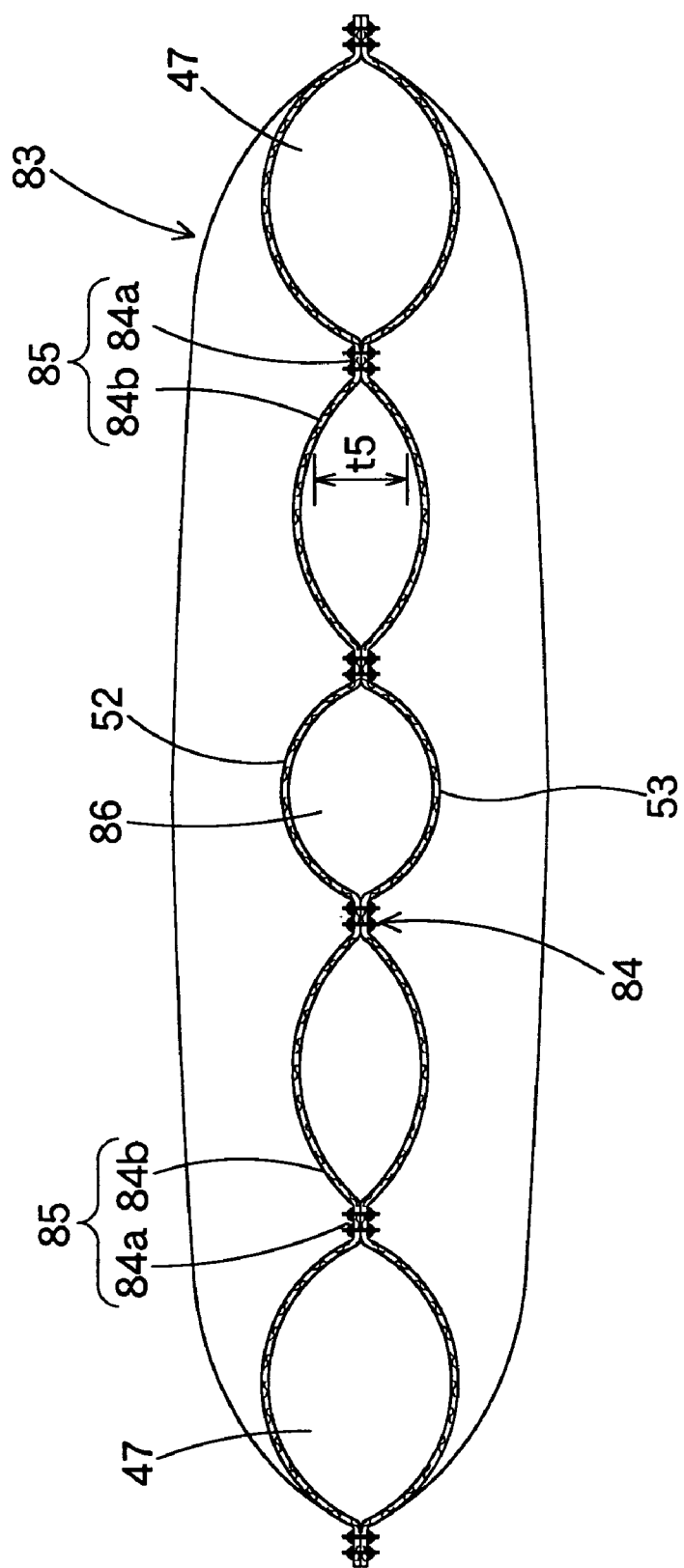
FIG. 23 is a schematic enlarged sectional view taken along a line XXIII—XXIII in FIG. 21.

An airbag having a construction shown in FIGS. 21 to 23 may be further used as the airbag 83. This airbag 83 has the same construction as the construction of the airbag 44 described above with the exception of the partition portions 84 that are so arranged at two positions in the transverse direction as to correspond to both right and left shins and the center gas flow path 86 that is arranged between the partition portions 84. Therefore, the same reference numerals are allocated and the explanation will be omitted.

Each partition portions 84 is fabricated by joining the passenger side wall portion 52 and the body side wall portion 53 with the sewing yarn 55 in the same way as the partition portion 79 in the airbag 78 described above. Each partition portions 84 has a substantial U shape. In the airbag 83, the right side and left side portions 84a of partition portion 84 and their peripheral portion 84b operate as the shin facing portions 85. The width L7 of each shin facing portions 85 in its vertical direction (longitudinal direction) is set to a width so that each shin facing portions 85 does not push the whole of each shins L of the passenger MD at the time of expansion and inflation of the airbag 83 (see FIG. 21). The thickness t5 of the shin facing portion 85 after completion of inflation is set to smaller than the thickness t2 of the knee protection expansion portion 48 (see FIGS. 22 and 23). In the airbag 83 of this embodiment, the portion between the partition potions 84 and 84 operates as the center gas flow path 86. This center gas flow path 86 causes the inflating gas flowing into the lower portion of the airbag 83 (mounting portion 46) to flow out towards the knee protection inflation portion 48. Because the center gas flow path 86 is arranged in this airbag 83, too, the airbag 83 can be suitably used for the airbag apparatus for knee protection of the driver's seat.

In the airbag 83 having the construction described above, the right side and left side portions 84a of partition portion 84 and their peripheral portions 84b operate as the shin facing portions 85. However, it is also possible to employ a construction in which the width of each partition portion in the transverse direction is reduced and the portion between the partition portion and another is used as the shin facing portion.

An airbag having a construction shown in FIGS. 24 to 28 may be further used as the airbag 144. This airbag 144 includes an airbag main body 145 having a bag shape and capable of expansion when the inflating gas flows in, and an inner tube 155 as a gas flow path arranged inside the airbag main body 145. The airbag main body 145 is formed of one woven fabric of flexible polyester or polyamide yarns. The airbag main body 145 has a substantial rectangular sheet shape at the time when expansion is complete in the same way as the airbag 44 described above. The airbag main body 145 has a mounting portion 146 at the lower end and a knee protection inflation portion 147 arranged at the upper portion in the same way as the airbag 44 described above. The mounting portion 146 is a portion that accommodates the inflator 37. The knee protection inflation portion 147 is a portion that protects the knees K of the passenger MD when inflation of the airbag 144 is complete. The knee protection inflation portion 147 is arranged in a substantially the full range of the transverse direction on the upper end side of the airbag main body 145.

The airbag main body 145 is formed in the following way. First, an airbag blank material formed of one woven fabric is folded back at the portion that is to be the lower end of the airbag main body 145. Two tethers 153 described below are sewed in with sewing yarns to the airbag blank material. The peripheral edges of the airbag blank material opposite each other after folding-back are then sewed with the sewing yarns, giving the airbag main body 145. The airbag main body 145 include the passenger side wall portion 150 on the driver side MD and the body side wall portion 151 on the column cover 13 side each having a substantial fan shape.

Two insertion holes 146a, 146a and one insertion hole 146b are defined at the mounting portion 146 on the lower side of the body side wall portion 151 in the same way as the airbag 44 described above.

The tethers 153 are arranged inside the area of the shin facing portion 148 between the mounting portion 146 and the knee protection inflation portion 147 in the airbag main body 145. In this embodiment, the tethers 153 are arranged at two positions on the right and left sides of a center longitudinal flow path portion 159 of the inner tube 155 described below. The tethers 153 restrict the separation distance between the passenger side wall portion 150 and the body side wall portion 151 when inflation of the airbag 144 is complete. In other words, the tether 153 is used for completing inflation in the state where the thickness of the shin facing portion 148 is smaller than that of the knee protection inflation portion 147. The shin facing portions 148 are arranged in an area substantially extending in the vertical direction in such a fashion as to correspond to both shins L of the passenger MD. When the motion of the knees K of the passenger MD is impeded by the knee protection inflation portion 147 after inflation of the airbag 144 is complete, the shin facing portion 148 is positioned at the shins L of the passenger MD. To stably protect the knees K of the passenger MD, it is preferred that the airbag 144 does not unnecessarily push the shins L upon completion of its inflation. Therefore, in the airbag 144 according to this embodiment, the tethers 153 for restricting the thickness at the time of completion of inflation are arranged inside the areas of the shin facing portions 148 that are positioned at the shins L. Each tether 153 is constituted by two cloth materials and is formed by sewing the cloth materials at one ends to the passenger side wall portion 150 and to the body side wall portion 151 and then sewing together the other ends of the cloth materials opposite each other.

The inner tube 155 serving as the gas flow path is separate from the airbag main body 145. The inner tube 155 is so arranged inside the airbag main body 145 as to cover around of the inflator 37. The inner tube 155 can cause the inflating gas G discharged from the inflator 37 to preferentially flow towards the knee protection inflation portion 147. In other words, in this embodiment, the inflating gas flowing into the inner tube 155 in the initial stage of inflation of the airbag 144 does not flow into the shin facing portion 148 as it flows towards the knee protection inflation portion 147. In this embodiment, the inner tube 155 is formed of one woven fabric consisting of flexible polyester or polyamide yarns in the same way as the airbag main body 145. The inner tube 155 is formed by turning back an inner tube blank of one woven fabric at a portion that is to become the lower end and joining the edges opposite each other with sewing yarn.

Figure 24:
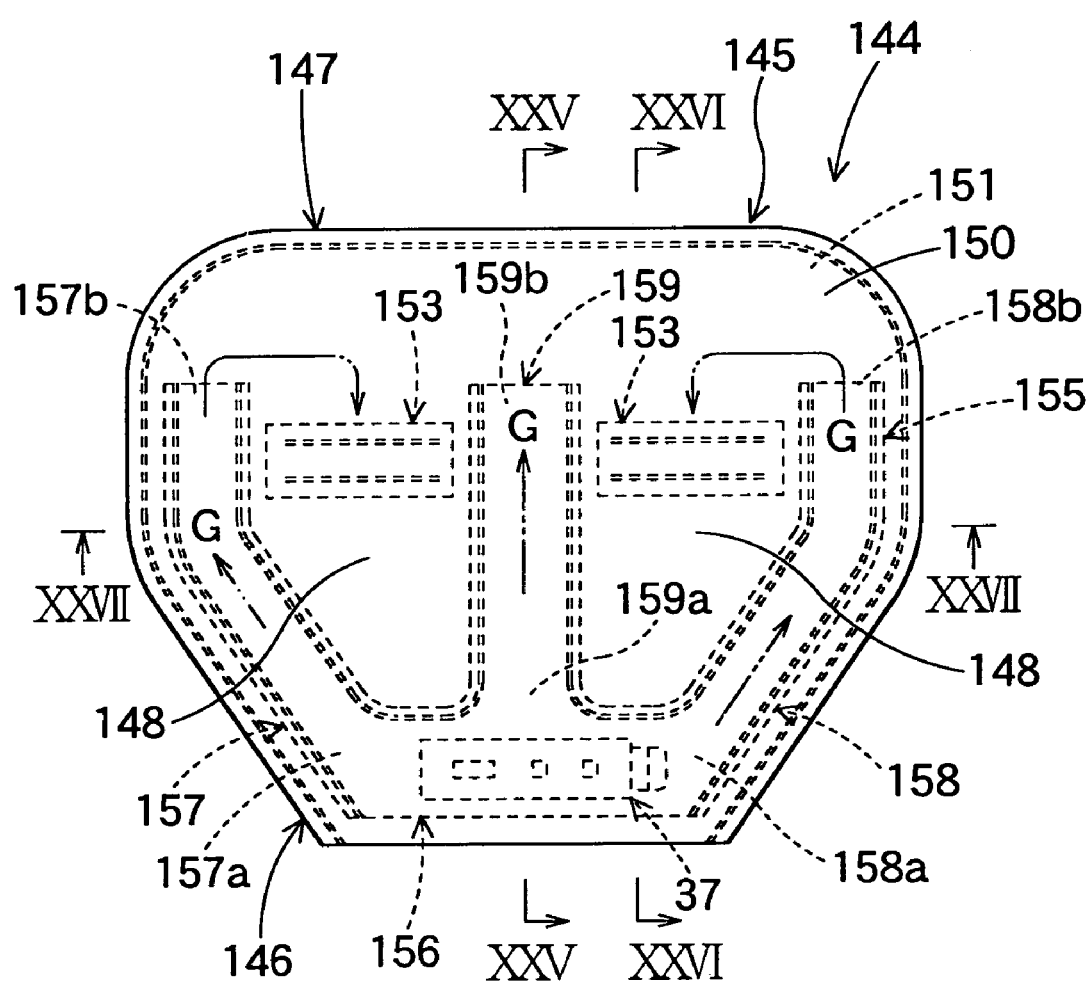
FIG. 24 is a front view of an airbag according to still another embodiment of the invention.
Figure 25:
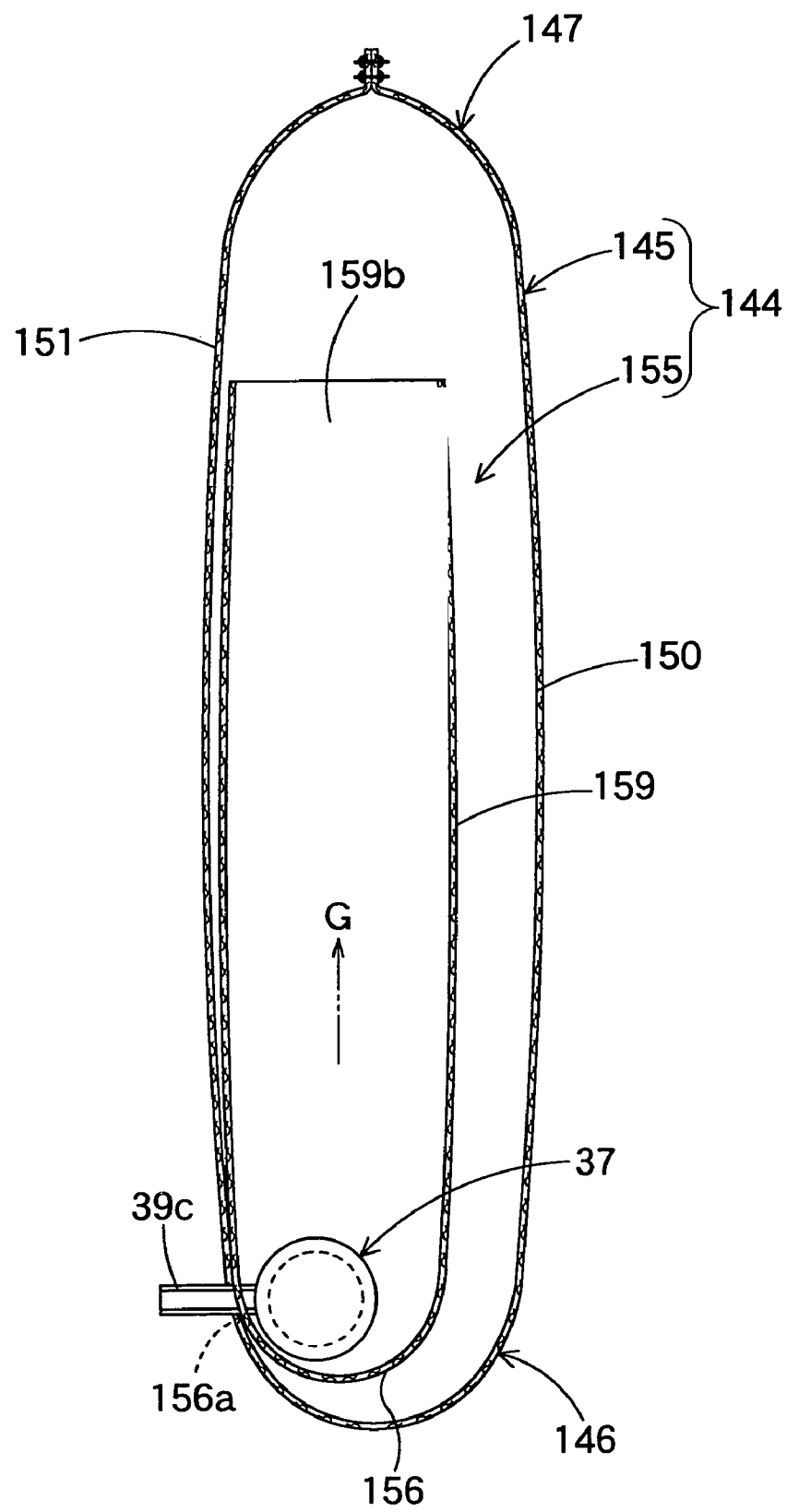
FIG. 25 is a schematic enlarged sectional view taken along a line XXV—XXV in FIG. 24.
Figure 26:
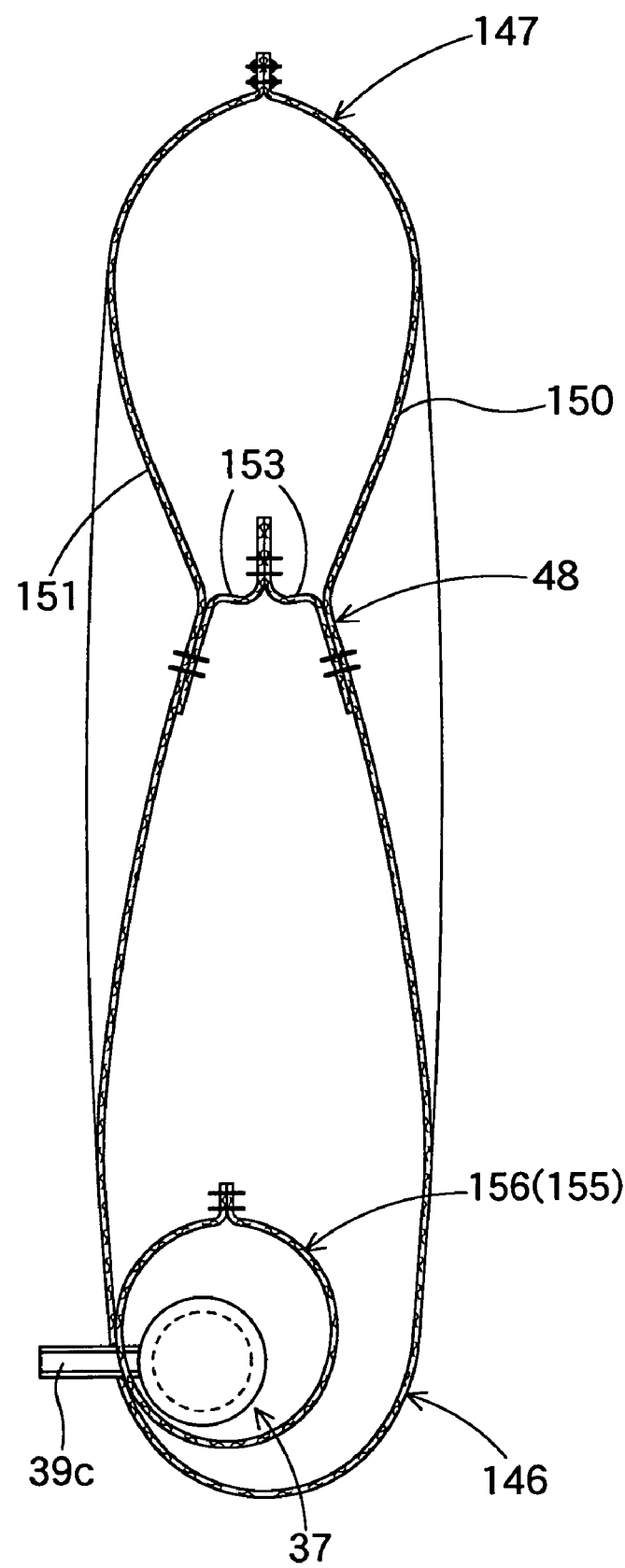
FIG. 26 is a schematic enlarged sectional view taken along a line XXVI—XXVI in FIG. 24.
Figure 27:
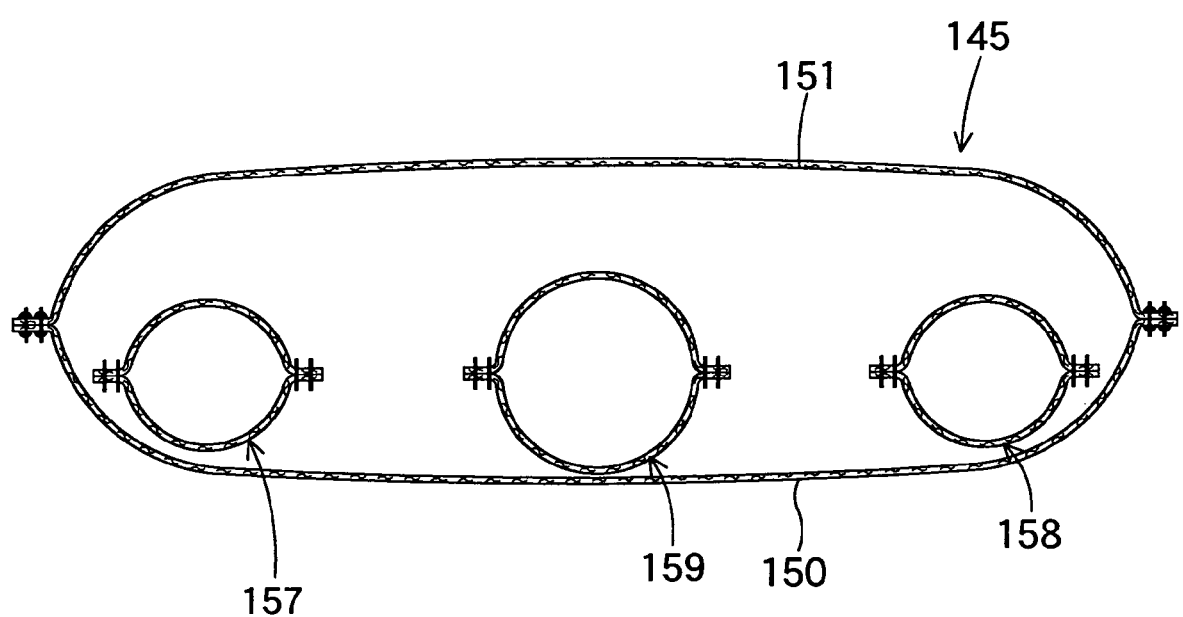
FIG. 27 is a schematic enlarged sectional view taken along a line XXVII—XXVII in FIG. 24.
Figure 28:
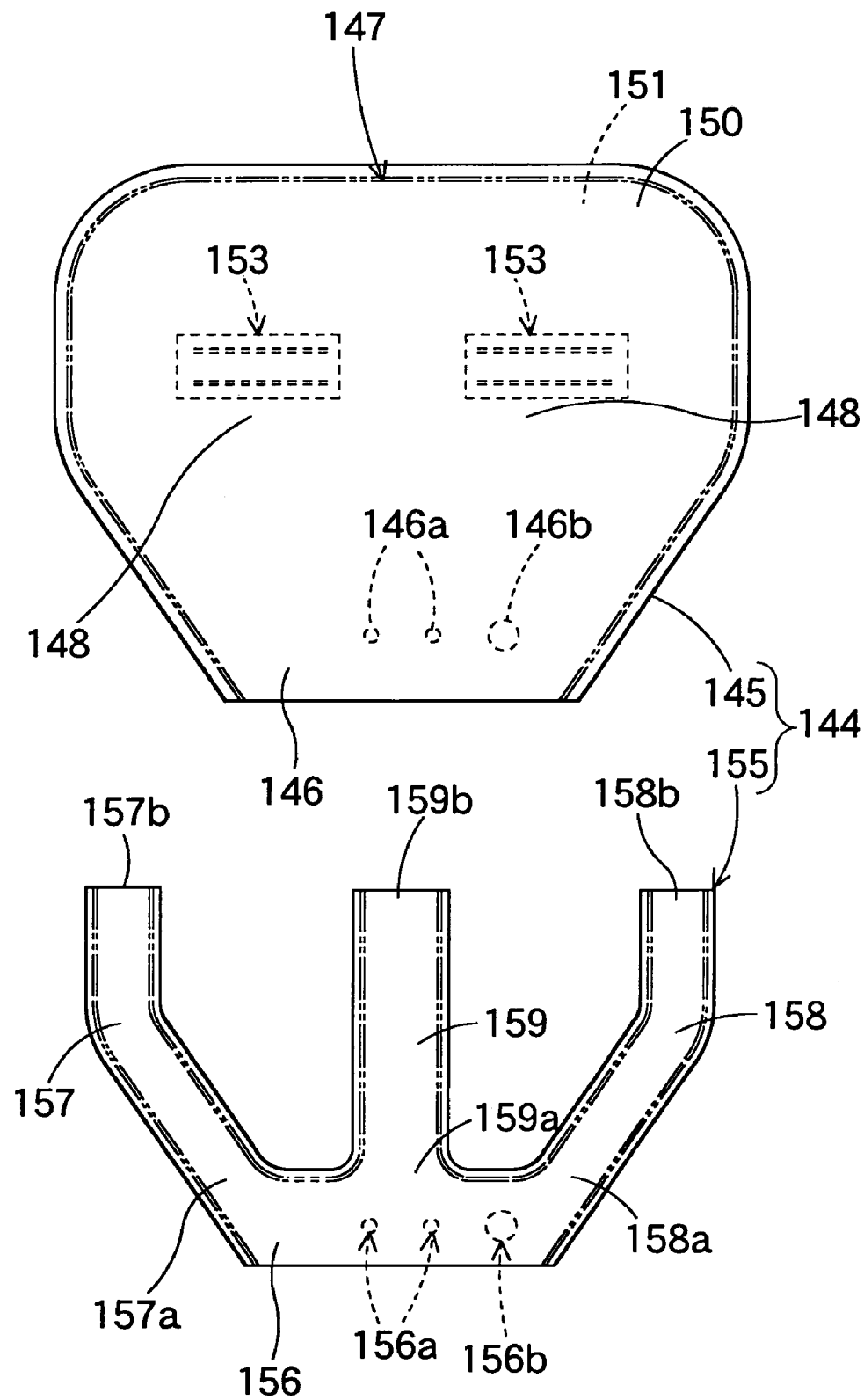
FIG. 28 is an expanded view of an airbag main body and an inner tube in the airbag in FIG. 24.

The inner tube 155 includes a transverse flow path portion 156 arranged at the mounting portion 146 as the lower end side of the airbag main body 145, right and left longitudinal flow path portions 158 and 157 serving as gas flow paths, and a center longitudinal flow path portion 159 serving as the center gas flow path as shown in FIGS. 24 and 28. The right and left longitudinal flow path portions 158 and 157 are arranged along the right and left edges of the airbag main body 145. The center longitudinal flow path portion 159 is so arranged as to extend in the vertical direction (longitudinal direction) close to the transverse center of the airbag main body 145. The transverse flow path portion 156 is arranged over substantially the whole area in the transverse direction at the mounting portion 146. The right and left longitudinal flow path portions 158 and 157 are connected at their lower ends 158a and 157a (front end) to the transverse flow path portion 156 and their upper ends (rear end) 158b and 157b are opened. Therefore, the inflating gas G discharged from the inflator 37 can flow out from the openings of the upper ends 158b and 157b towards the knee protection inflation portion 147 without flowing to the periphery (shin facing portions 148), via the transverse flow path portion 156. Similarly, the center longitudinal flow path portion 159 is connected at its lower end (front end) 159a to the transverse flow path portion 156 and its upper end (rear end) is open so that the inflating gas G discharged from the inflator 37 can flow out to the knee protection inflation portion 147 from the opening at the upper end 159b without flowing to the periphery (shin facing portions 148), via the transverse flow path portion 156.

Two insertion holes 156a and 156a for inserting the bolts 39c of the inflator 37 and an insertion hole 156b for inserting the main body 38 of the inflator 37 are defined in the transverse flow path portion 156 in such a fashion as to respectively correspond to the insertion holes 146a, 146a and 146b of the monuting portion 146 of the airbag main body 145.

This airbag 144 is produced in the following way. Fabrics constituting the tethers 153 are sewed in advance to predetermined positions of the airbag material constituting the airbag main body 145, that is, at the passenger side 150 and vehicle-front side wall portions 151. The bolt 39c is allowed to protrude from the insertion hole 156a and the main body 38 is allowed to protrude from the insertion hole 156b so that the inflator 37 can be arranged inside the inner tube 155. The inner tube 155 with the built-in inflator 37 is thereafter placed on the airbag material while it is still in the flat expanded state. The bolt 39c is allowed to protrude from the insertion hole 146a and the main body 38 is allowed to protrude from the insertion hole 146b. The airbag material is folded back at where the lower end is to be and the edges opposite each other are sewed together with sewing yarn, giving the airbag 144. This airbag 144 can be mounted to the vehicle in the same way as the airbag 44 described above.

When the airbag 144 having the construction described above is used, the inflating gas G flowing into the lower portion (mounting portion 146) of the airbag main body 145 does not flow towards the shin facing portions 148 in the initial stage of inflation of the airbag 144 but flows into the knee protection inflation portion 147 through the inner tube 155 which is the gas flow path. In other words, in the initial stage of inflation of the airbag 144, the shin facing portions 148 are inhibited from thickly inflating. Therefore, even when the airbag 144 extends and expands while the shins L of the passenger MD are very close the column cover 13, it is possible to prevent the shins L of the passenger MD from being pushed unnecessarily by the airbag 144. The inner tube 155 serving as the gas flow path capable of causing the inflating gas G to flow towards the knee protection inflation portion 147 is arranged in the airbag 144. Therefore, the knee protection inflating portion 147 can quickly extend and expand, and the knees K of the passenger MD can be stably protected by the knee protection inflation portion 147 after completion of inflation even when the passenger MD is very close to the column cover 13.

In the airbag 144 having the construction described above, the inflating gas flowing into the lower portion of the airbag main body 145 flows into the knee protection inflation portion 147 arranged on the upper side of the airbag main body 145 through the inner tube 155. In other words, the inflating gas hardly flows at all into the shin facing portion 148 in the initial stage of inflation of the airbag 144 but flows into the knee protection inflation portion 147 and only then into the shin facing portions 148 (see two-dot-chain line in FIG. 24). Therefore, in the initial stage of inflation of the airbag 144, during which time the shin f acing portions 148 can extend between the passenger MD and the column cover 13, which hardly inflates at all. As a result, even when the gap between the knee K of the passenger MD and the column cover 13 is small, the airbag 144 can smoothly expand in that narrow gap.

In the airbag 144 having the construction described above, the inner tube 155 as the gas flow path is arranged inside the airbag main body 145. Therefore, the inflating gas flowing into the lower portion (mounting portion 146) of the airbag 144 does not directly strike the base fabric constituting the airbag main body 145 until it reaches the knee protection inflation portion 147, and the base fabric constituting the airbag main body 145 can be protected. In the airbag 144 having the construction described above, further, the inflating gas flows into the inner tube 155 in the initial stage of inflation of the airbag 144 so that the inner tube 155 can be first inflated. The airbag main body 145 unfolds with the progress of inflation of the inner tube 155 and extends. In other words, the airbag main body 145 extends with inflation of the inner tube 155 under the state where the inflating gas hardly flows to the periphery of the inner tube 155, and the airbag 144 can quickly extend. Furthermore, in the airbag 144 having the construction described above, the inner tube 155 is arranged in such a fashion as to cover around of the inflator 37. Therefore, this inner tube 155 plays the same role as a reinforcing fabric that is ordinarily arranged near the arrangement position of the inflator in the airbag. In other words, a separate reinforcing fabric need not be provided to the airbag main body 145.

In the airbag 144 having the construction described above, the tethers 153 are arranged inside the area of the shin facing portions 148 so that the thickness of each shin facing portions 148 after completion of inflation is smaller than the thickness of the knee protection inflation portion 147. However, the arrangement is not of course restricted to this and it is also possible to set the thickness of the shin facing portions after completion of inflation to substantially the same thickness as that of the knee protection inflation portion after completion of inflation without arranging the tethers in the area of the shin facing portions. However, in order for the shin facing portions of the airbag after completion of inflation not to push unnecessarily the shins of the passenger, it is preferred to set the thickness of the shin facing portion after completion of inflation smaller than the thickness of the knee protection inflation portion.

Figure 29:
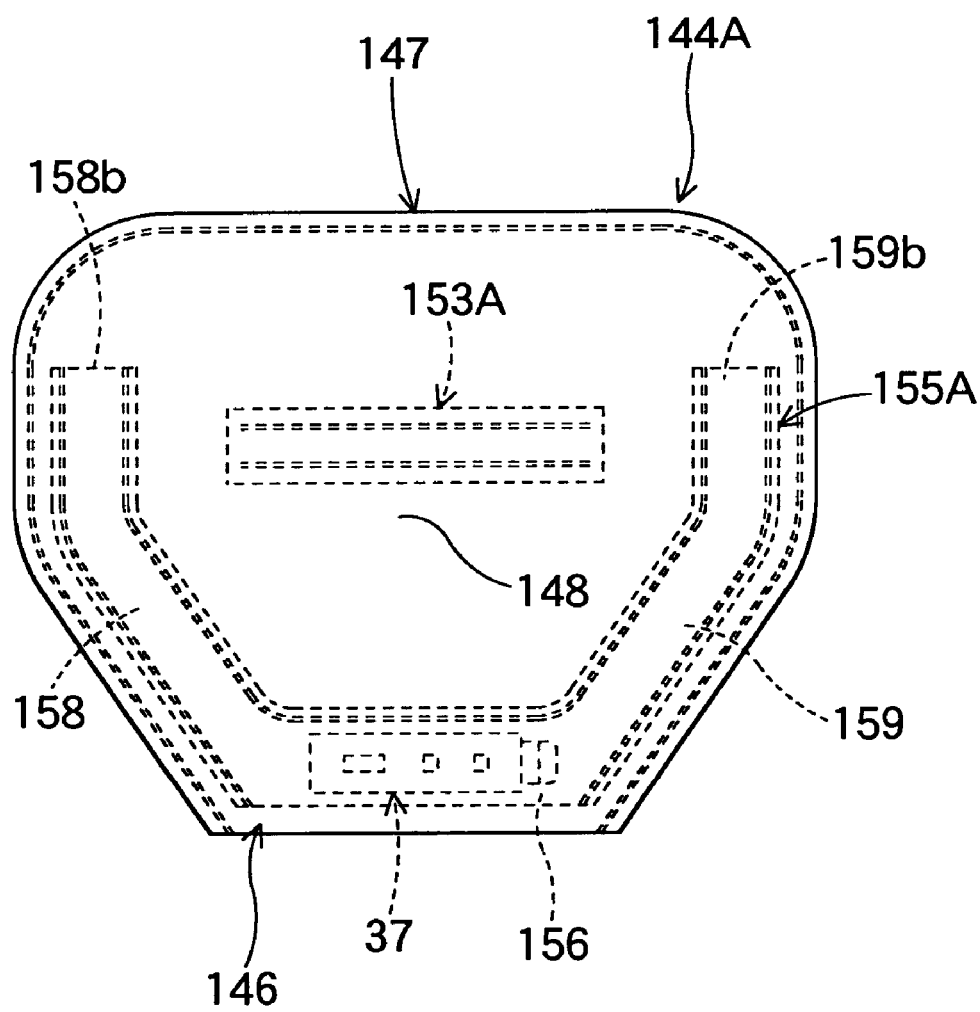
FIG. 29 is a front view of an airbag according to still another embodiment of the invention.

In the airbag 144 having the construction described above, the center gas flow path (center longitudinal flow path portion) 159 extending in the front and rear direction is arranged along the center beside the gas flow paths on both right and left edges (right and left longitudinal flow path portions 158 and 157). Therefore, the inflating gas flowing into the airbag 144 flows into the knee protection inflation portion 147 through the center longitudinal flow path portion 159. In comparison with the case where the center longitudinal flow path portion 159 is not provided, therefore, the inflating gas can quickly flow into the knee protection inflation portion 147 and the airbag 144 can expand further quickly. Needless to say, when this point need not be taken into consideration, it is possible to use an airbag 144A in which an inner tube 155A not having a center longitudinal flow path portion is arranged, as shown in FIG. 29. Because the center longitudinal flow path portion is not disposed in this airbag 144A, the tether 153A is substantially arranged at one position throughout the entire length in the transverse direction in the area of the shin facing portion 148.

Incidentally, since the inner tube 155 includes the center longitudinal flow path 159 in the airbag 144 of this embodiment, the portion near the center of the airbag 144 in the transverse direction inflates thickly, too. However, the portion of the airbag 144 near the center longitudinal flow path portion 159 expands at the time of inflation of the airbag 144 in such a fashion as to cover vehicle rear side of the column cover 13 at the transverse center. The column cover 13 is arranged in the driver's seat at the transverse center so as to protrude toward vehicle rear side. Therefore, the shins of the passenger MD do not move much in the transverse direction. Because the portion near the center longitudinal flow path portion 159 after completion of inflation does not put excess pressure on the shins of the passenger MD, the airbag 144 can be suitably used for the knee protection airbag apparatus for the driver's seat.

This embodiment has been explained regarding the knee protection airbag apparatus S for protecting the knees K of the driver MD, arranged below the steering column 9 by way of example. However, the knee protection airbag apparatus of the invention can be applied to the knee protection airbag apparatus arranged in front of the passenger seat for protecting the knees of the passenger seated on the other front seat. When the airbag apparatus is applied to the knee protection airbag apparatus for the other front seat, the airbag 44, 61, 78 or 144A is preferably employed. This is because none of these airbags 44, 61, 78 and 144A has the center gas flow path.

The embodiments have been explained about the airbags 44, 61, 68, 68A, 72, 78, 83, 44A and 144A in which the periphery of the woven fabric having the predetermined shape is sewed with the sewing yarn 55 by way of example. However, it is also possible to use an airbag formed by double weaving.

What is claimed is:

1. A knee protection airbag apparatus having an airbag with the following construction:
    said airbag having a construction in which said airbag is folded and accommodated below the area in front of the knees of a passenger who is seated, inflates upward toward the vehicle rear so as to be capable of protecting the knees of the passenger when inflating gas inserted, and includes;
    a knee protection inflation portion disposed on the upper side of the airbag after completion of inflation, capable of protecting both knees of the passenger;
    a shin facing portion disposed below said knee protection inflation portion at the time of completion of inflation, inside an area extending substantially vertically at the position of both shins of the passenger; and
    gas flow paths disposed inside both right and left edge sides of the airbag, capable of causing the inflating gas flowing at a lower part of said airbag to flow towards said knee protection inflation portion while inhibiting said shin facing portion from thickly inflating in the initial stage of inflation of said airbag, wherein:
    the thickness of said shin facing portion at the time of completion of inflation is set smaller than the thickness of said knee protection inflation portion at the time of completion of inflation; and
    said shin facing portion does not permit the inflow of the inflating gas.

2. A knee protection airbag apparatus as defined in claim 1, wherein an auxiliary inflation portion that folds out while inhibiting the inflow of the inflating gas in the initial stage of expansion of said airbag but permits the inflow of the inflating gas from said knee protection inflation portion when the internal pressure of said airbag rises is arranged adjacent to said knee protection inflation portion.

3. A knee protection airbag apparatus as defined in claim 1, wherein said shin facing portions are arranged separately on the right and left sides so as to be at the positions of the right and left shins, and a center gas flow path capable of causing the inflating gas flowing at the lower part of said airbag to flow towards said knee protection inflation portion is arranged between said shin facing portions.

4. A knee protection airbag apparatus as defined in claim 3, wherein said airbag apparatus is arranged in front of a passenger seated on a driver's seat and below a steering column.

5. A knee protection airbag apparatus having an airbag with the following construction:
    said airbag having a construction in which said airbag is folded and accommodated below the area in front of the knees of a passenger who is seated, inflates upward toward the vehicle rear so as to be capable of protecting the knees of the passenger when inflating gas inserted, and includes;
    a knee protection inflation portion disposed on the upper side of the airbag after completion of inflation, capable of protecting both knees of the passenger;
    a shin facing portion disposed below said knee protection inflation portion at the time of completion of inflation, inside an area extending substantially vertically at the position of both shins of the passenger; and gas flow paths disposed inside both right and left edge sides of the airbag, capable of causing the inflating gas flowing at a lower part of said airbag to flow towards said knee protection inflation portion while inhibiting said shin facing portion from thickly inflating in the initial stage of inflation of said airbag, wherein said gas flow paths are formed by a U-shaped inner tube which is arranged inside said airbag and which has flexibility, said inner tube opening its upper ends for flowing out to the inflation gas.

6. A knee protection airbag apparatus as defined in claim 5, wherein the thickness of said shin facing portion at the time of completion of inflation is set smaller than the thickness of said knee protection inflation portion at the time of completion of inflation.

7. A knee protection airbag apparatus as defined in claim 6, wherein an auxiliary inflation portion that folds out while inhibiting the inflow of the inflating gas in the initial stage of expansion of said airbag but permits the inflow of the inflating gas from said knee protection inflation portion when the internal pressure of said airbag rises is arranged adjacent to said knee protection inflation portion.

8. A knee protection airbag apparatus as defined in claim 5, wherein said inner tube is arranged in such a fashion as to surround an inflator supplying the inflating gas to said airbag.

9. A knee protection airbag apparatus as defined in claim 5, wherein said shin facing portions are arranged separately on the right and left sides so as to be at the positions of the right and left shins, and a center gas flow path capable of causing the inflating gas flowing at the lower part of said airbag to flow towards said knee protection inflation portion is arranged between said shin facing portions.

10. A knee protection airbag apparatus as defined in claim 9, wherein said airbag apparatus is arranged in front of a passenger seated on a driver's seat and below a steering column.

11. A knee protection airbag apparatus including an airbag having a construction in which said airbag is folded and accommodated below an area in front of the knees of a passenger who is seated, inflates upward toward the vehicle rear so as to be capable of protecting the knees of the passenger when inflating gas inserted, said airbag includes:
a U-shaped partition portion formed by joining a passenger side wall portion and a body side wall portion, said partition portion including a transverse rod portion and longitudinal rod portions, the transverse rod portion extending to the right and left of an inflator side when the airbag is inflated, the longitudinal rod portions extending from both right and left ends of the transverse rod portion in a rear direction;
a knee protection inflation portion disposed on the upper side of the airbag after completion of inflation, capable of protecting both knees of the passenger;
a shin facing portion disposed below said knee protection inflation portion at the time of completion of inflation, inside an area extending substantially vertically at the position of both shins of the passenger; and
gas flow paths disposed inside both right and left edge sides of the airbag, capable of causing the inflating gas flowing at a lower part of said airbag to flow towards said knee protection inflation portion while inhibiting said shin facing portion from thickly inflating in the initial stage of inflation of said airbag, wherein a portion between right and left edges of the airbag and the longitudinal rod portions constitute the gas flow paths.

12. A knee protection airbag apparatus as defined in claim 11, wherein the thickness of said shin facing portion at the time of completion of inflation is set smaller than the thickness of said knee protection inflation portion at the time of completion of inflation.

13. A knee protection airbag apparatus as defined in claim 12, wherein an auxiliary inflation portion that folds out while inhibiting the inflow of the inflating gas in the initial stage of expansion of said airbag but permits the inflow of the inflating gas from said knee protection inflation portion when the internal pressure of said airbag rises is arranged adjacent to said knee protection inflation portion.

14. A knee protection airbag apparatus as defined in claim 11, wherein said shin facing portions are arranged separately on the right and left sides so as to be at the positions of the right and left shins, and a center gas flow path capable of causing the inflating gas flowing at the lower part of said airbag to flow towards said knee protection inflation portion is arranged between said shin facing portions.

15. A knee protection airbag apparatus as defined in claim 14, wherein said airbag apparatus is arranged in front of a passenger seated on a driver's seat and below a steering column.

* * * * *